(12) United States Patent
Moon et al.

(10) Patent No.: US 11,467,322 B2
(45) Date of Patent: Oct. 11, 2022

(54) DUAL CAMERA MODULE, OPTICAL DEVICE, CAMERA MODULE, AND METHOD FOR OPERATING CAMERA MODULE

(71) Applicant: LG INNOTEK CO., LTD., Seoul (KR)

(72) Inventors: Young Seop Moon, Seoul (KR); Ui Jun Kim, Seoul (KR); Han Young Kim, Seoul (KR); Hyung Kim, Seoul (KR); Sang Hun Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 12 days.

(21) Appl. No.: 16/985,856

(22) Filed: Aug. 5, 2020

(65) Prior Publication Data
US 2020/0363568 A1 Nov. 19, 2020

Related U.S. Application Data

(63) Continuation of application No. 16/332,690, filed as application No. PCT/KR2017/009978 on Sep. 12, 2017, now Pat. No. 10,768,345.

(30) Foreign Application Priority Data

Sep. 13, 2016 (KR) .................. 10-2016-0118031
Sep. 13, 2016 (KR) .................. 10-2016-0118037
Nov. 7, 2016 (KR) .................. 10-2016-0147688

(51) Int. Cl.
*G02B 3/14* (2006.01)
*H04N 5/225* (2006.01)
(Continued)

(52) U.S. Cl.
CPC .............. *G02B 3/14* (2013.01); *G02B 7/021* (2013.01); *G02B 7/09* (2013.01); *G02B 13/009* (2013.01);
(Continued)

(58) Field of Classification Search
CPC . G02B 3/14; G02B 7/021; G02B 7/09; G02B 13/0045; G02B 27/646;
(Continued)

(56) References Cited

U.S. PATENT DOCUMENTS

2002/0075258 A1 6/2002 Park et al.
2010/0231691 A1* 9/2010 Lee ................... H04N 13/239
348/47

(Continued)

FOREIGN PATENT DOCUMENTS

CN 1720466 A 1/2006
CN 101228472 A 7/2008
(Continued)

OTHER PUBLICATIONS

Office Action dated Nov. 23, 2020 in Chinese Application No. 201780056465.0.
(Continued)

*Primary Examiner* — Nicholas G Giles
(74) *Attorney, Agent, or Firm* — Saliwanchik, Lloyd & Eisenschenk

(57) ABSTRACT

The present embodiment relates to a dual camera module comprising: a first camera module including a first liquid lens and capturing a first image; and a second camera module including a second liquid lens and capturing a second image, wherein a viewing angle of the first camera module is smaller than a viewing angle of the second camera module, at least a part of the viewing angle of the first camera module is included in the viewing angle of the second camera module such that there is an overlapping area between the first image and the second image so as to enable a composite image formed by combining the first image and the second image to be generated, and when the first camera module is focused, a focal length of the first liquid lens is (Continued)

varied according to the distance between the first liquid lens and a subject, and when the second camera module is focused, a focal length of the second liquid lens is varied according to the distance between the second liquid lens and the subject.

19 Claims, 22 Drawing Sheets

(51) Int. Cl.
  *H04N 5/232*    (2006.01)
  *G03B 37/04*    (2021.01)
  *G02B 7/02*     (2021.01)
  *G02B 27/64*    (2006.01)
  *G03B 3/10*     (2021.01)
  *G02B 13/00*    (2006.01)
  *G02B 7/09*     (2021.01)
  *G03B 13/36*    (2021.01)

(52) U.S. Cl.
  CPC ....... *G02B 13/0075* (2013.01); *G02B 27/646* (2013.01); *G03B 3/10* (2013.01); *G03B 13/36* (2013.01); *G03B 37/04* (2013.01); *H04N 5/2254* (2013.01); *H04N 5/2258* (2013.01); *H04N 5/2259* (2013.01); *H04N 5/23212* (2013.01); *H04N 5/23216* (2013.01); *H04N 5/23232* (2013.01); *H04N 5/23296* (2013.01); *G03B 2205/0046* (2013.01); *G03B 2205/0084* (2013.01)

(58) Field of Classification Search
  CPC .... G02B 13/0075; G02B 13/009; G03B 3/10; G03B 13/36; G03B 37/04; H04N 5/2254; H04N 5/2258; H04N 5/2259; H04N 5/23212; H04N 5/23216; H04N 5/23232; H04N 5/23296
  See application file for complete search history.

(56) References Cited

U.S. PATENT DOCUMENTS

| | | |
|---|---|---|
| 2010/0295987 A1 | 11/2010 | Berge |
| 2011/0279654 A1* | 11/2011 | Ueda ................... H04N 13/296 348/49 |
| 2012/0140044 A1* | 6/2012 | Galstian ............... H04N 13/239 348/47 |
| 2012/0275030 A1 | 11/2012 | Kong et al. |
| 2013/0002973 A1 | 1/2013 | Chen |
| 2014/0002626 A1* | 1/2014 | Yu .......................... A61B 1/247 348/66 |
| 2016/0028949 A1 | 1/2016 | Lee et al. |

FOREIGN PATENT DOCUMENTS

| | | |
|---|---|---|
| CN | 101458346 A | 6/2009 |
| CN | 102981239 A | 3/2013 |
| CN | 103415806 A | 11/2013 |
| JP | 2006-64949 A | 3/2006 |
| JP | 2016-90911 A | 5/2016 |
| KR | 10-2007-0104805 A | 10/2007 |
| KR | 10-2007-0118847 A | 12/2007 |
| KR | 10-2013-0077367 A | 7/2013 |
| KR | 10-2013-0086803 A | 8/2013 |
| WO | WO-2006/095274 A1 | 9/2006 |

OTHER PUBLICATIONS

International Search Report dated Dec. 19, 2017 in International Application No. PCT/KR2017/009978.
Na, M. G., "Seoul Night View by Photographer with G5: Do Not Ignore Phone Camera Again," May 11, 2016, (http://ppss.kr/archives/80260), pp. 1-16, along with the English translation of pp. 1-3.
Extended European Search Report dated May 20, 2019 in European Application No. 17851102.8.
Office Action dated Apr. 23, 2020 in Chinese Application No. 201780056465.0.
Office Action dated Dec. 23, 2019 in U.S. Appl. No. 16/332,690.
Notice of Allowance dated May 6, 2020 in U.S. Appl. No. 16/332,690.
Office Action dated Sep. 7, 2021 in Japanese Application No. 2019-514021.

\* cited by examiner

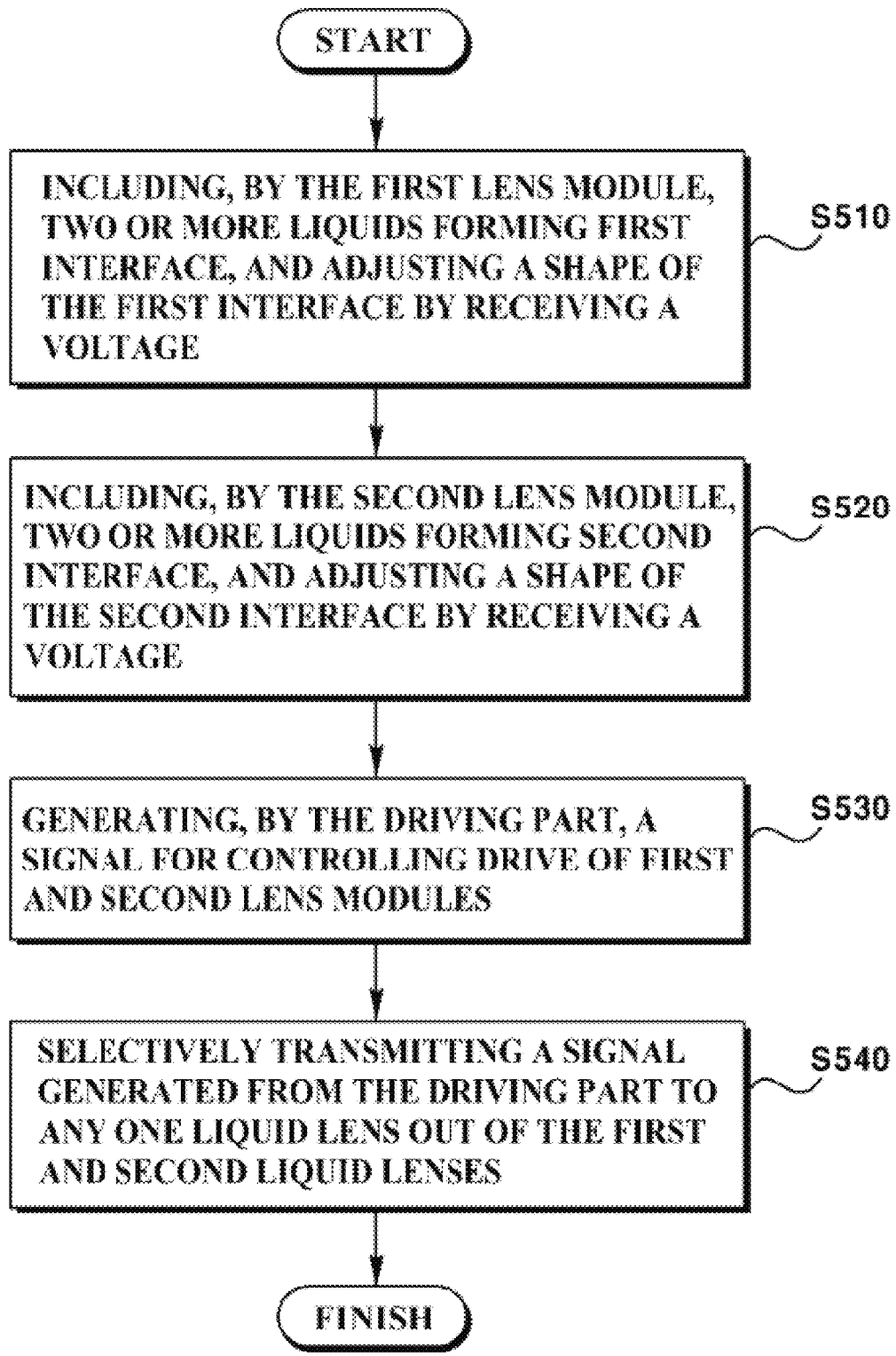

DUAL CAMERA MODULE, OPTICAL DEVICE, CAMERA MODULE, AND METHOD FOR OPERATING CAMERA MODULE

CROSS-REFERENCE TO RELATED APPLICATIONS

This application is a continuation of U.S. patent application Ser. No. 16/332,690, filed Mar. 12, 2019, which is the U.S. national stage application of International Patent Application No. PCT/KR2017/009978, filed Sep. 12, 2017, which claims the benefit under 35 U.S.C. § 119 of Korean Patent Application Nos. 10-2016-0118031, filed Sep. 13, 2016; 10-2016-0118037, filed Sep. 13, 2016; and 10-2016-0147688, filed Nov. 7, 2016; the disclosures of each of which are incorporated herein by reference in their entirety.

TECHNICAL FIELD

The teachings in accordance with exemplary and non-limiting embodiments of this invention relate generally to a dual camera module and an optical device. The exemplary embodiments of this invention relate generally to a camera module and a method for operating the camera module, and more particularly, to a camera module configured to perform an AF (Auto Focus) and an OIS (Optical Image Stabilization) using one hardware by comprising a switching part between a driving part and two liquid lenses to open or short-circuit a switch of the switching part, and to a method for operating the camera module.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals.

Among the representative items thereof, there is mentioned a camera module capturing a subject in a picture or a video.

A camera module can perform an AF function automatically adjusting a focus in response to a distance to a subject and an OIS function correcting handshake of a user when a subject is captured.

A general camera module performs an AF function and an OIS function using a lens driving device. The lens driving device is a device activating a lens module in response to an electromagnetic interaction between a coil and a magnet and may be called a VCM (Voice Coil Motor).

Meantime, a dual camera module is a camera module that comprises two single camera modules, where two or more images captured by each single camera module are combined to generate a composite image having a high resolution or a high resolving power and a high MTF (Modulation Transfer Function). However, the conventional dual camera module suffers from a disadvantage in that there is generated an electromagnetic interference between lens driving devices.

Moreover, the lens driving device suffers another disadvantage in that lots of installation spaces are occupied due to assembly formed with lots of parts. As a result, there may be generated a design-wise difficulty in proximately arranging single camera modules. Furthermore, when a single camera module at one side is used to drive a lens driving device in order to inhibit the aforementioned disadvantages, a single camera module at the other side cannot perform an AF function to thereby deteriorate the quality of composite image.

As the technologies of camera are advanced, a variety of cameras are developed that enhance user conveniences. For example, a dual camera module is being spotlighted where a front camera and a rear camera are simultaneously operated to respectively capture a front subject and a rear subject for combination as one image, or subjects respectively captured by a general angle and a wide angle are combined as one image.

However, the dual camera module still suffers disadvantages in that two hardware devices are required in order to operate two cameras to thereby increase the weight of camera, and to increase the manufacturing cost. Therefore, the thing is that development of a device and a method configured to operate a dual camera module using a single hardware is urgently required.

DETAILED DESCRIPTION OF THE INVENTION

Technical Subject

In order to solve the aforementioned disadvantages/problems, an exemplary embodiment of the present invention is to provide a dual camera module configured to comprise a single camera module for independently performing an AF function and an OIS function while not being affected by an electromagnetic interference even in proximate arrangement, and to have a compact structure with a high MTF in composite images.

In order to solve the aforementioned disadvantages/problems, an exemplary embodiment of the present invention is to provide a camera module configured to perform an AF (Auto Focus) and an OIS (Optical Image Stabilization) using one hardware by comprising a switching part between a driving part and two camera modules to open or short-circuit a switch of the switching part, and to provide a method for operating the camera module.

In order to solve the aforementioned disadvantages/problems, another exemplary embodiment of the present invention is to provide a camera module configured to reduce the volume and manufacturing cost of camera by operating a dual camera using one hardware due to comprising a switching part connecting a driving part and two camera modules, and to provide a method for operating the camera module.

Technical Solution

A dual camera module according to an exemplary embodiment comprising:

a first camera module comprising a first liquid lens and capturing a first image; and a second camera module comprising a second liquid lens and capturing a second image, wherein a viewing angle of the first camera module is smaller than a viewing angle of the second camera module, at least a part of the viewing angle of the first camera module is comprised in the viewing angle of the second camera module such that there is an overlapping area between the first image and the second image so as to enable a composite image formed by combining the first image and the second image to be generated, and when the first camera module is focused, a focal length of the first liquid lens is varied according to the distance between the first liquid lens and a subject, and when the second camera module is focused, a focal length of the second liquid lens is varied according to the distance between the second liquid lens and the subject.

The first camera module may be such that the focusing is performed by varying first interface of the first liquid lens, a focal length of the first liquid lens is shortened when a subject approaches the first liquid lens, the second camera module is focused by varying second interface of the second liquid lens, and a focal length of the second liquid lens is shortened as the subject approaches the second liquid lens.

The first liquid lens may comprise a first cavity arranged with two mutually different liquids, an upper diameter of the first cavity may be greater than a lower diameter of the first cavity, a diameter of the first cavity may be gradually reduced from an upper part to a lower part, the second liquid lens may comprise a second cavity arranged with mutually different two liquids, an upper diameter of the second cavity may be greater than a lower diameter of, and a diameter of the second cavity may be gradually reduced from an upper part to a lower part.

The first liquid lens may comprise a first cavity arranged with two mutually different liquids, a lower diameter of the first cavity may be greater than an upper diameter, a diameter of the first cavity may be gradually reduced from a lower part to an upper part, the second liquid lens may comprise a second cavity arranged with two mutually different liquids, a lower diameter of second cavity may be greater than an upper diameter, and a diameter of second cavity may be gradually reduced from a lower part to an upper part.

When a subject is focused at a position distanced by 10 cm from a first camera module, a shape of a first interface of the first liquid lens may be convex to an upper direction of the first cavity, and when a subject is focused at a position distanced by 10 cm from a second camera module, a shape of second interface of the second liquid lens may be convex to an upper direction of the second cavity.

When a subject is focused at a position distanced by 10 cm from a first camera module, a shape of a first interface of the first liquid lens may be convex to a lower direction of the first cavity, and when a subject is focused at a position distanced by 10 cm from a second camera module, a shape of second interface of the second liquid lens may be convex to a lower direction of the second cavity.

When a subject is focused at a position distanced by 10 cm from a first camera module, a curvature of the first interface may be greater than a curvature of the second interface when a subject is disposed at a position distanced by 10 cm from the second camera module.

The first camera module may further comprise a first lens holder, the first lens holder may comprise a first lens disposed at an uppermost area inside the first lens holder, the second camera module may further comprise a second lens holder, the second lens holder may comprise a second lens disposed at an uppermost area inside the second lens holder, and a diameter of first lens may be smaller than a diameter of the second lens.

The first camera module may comprise a first cover member accommodating the first liquid lens, the second camera module may comprise a second cover member accommodating the second liquid lens, the first cover member may comprise a first lateral plate forming a first upper plate forming an upper part of the first cover member and a lateral surface, the second cover member may comprise a second upper plate forming an upper surface of the second cover member and a lateral surface, and an area of the first upper plate and an area of the second upper plate may be mutually same.

The area of the first upper plate may be narrower than the area of the second upper plate.

A maximum diameter of cavity formed on the first liquid lens may be smaller than a maximum diameter of cavity formed on the second liquid lens.

A minimum diameter of cavity formed on the first liquid lens may be smaller than a minimum diameter of cavity formed on the second liquid lens.

A focal length of second camera module may be smaller than a focal length of first camera module.

The first interface may be changed to adjust an MTF value of the first image, and the second interface may be changed to adjust an MTF value of second image.

The first and second camera modules may simultaneously perform an AF function.

The OIS function may be performed by varying of the first interface of first liquid lens.

The OIS function may be performed by varying of the second interface of the second liquid lens.

An optical device according to an exemplary embodiment may comprise:

a first camera module comprising a first liquid lens and capturing a first image;

a second camera module comprising a second liquid lens and capturing a second image, and a controller generating a composite image by combining the first image and the second image, wherein a viewing angle of the first camera module is smaller than a viewing angle of the second camera module, at least a part of the viewing angle of the first camera module is comprised in the viewing angle of the second camera module such that there is an overlapping area between the first image and the second image so as to enable a composite image formed by combining the first image and the second image to be generated, and a focal length of the first liquid lens is varied according to the distance between the first liquid lens and a subject when the first camera module is focused, and a focal length of the second liquid lens is varied according to the distance between the second liquid lens and the subject when the second camera module is focused, and wherein the controller is such that resolution of the composite image may be increased while being decreased when magnification of the composite image is enlarged by digital-zooming the composite image about a center of overlapped area.

A dual camera module according to an exemplary embodiment comprising:

a first camera module comprising a first liquid lens and capturing a first image; and a second camera module comprising a second liquid lens and capturing a second image, wherein a viewing angle of the first camera module is smaller than a viewing angle of the second camera module, at least a part of the viewing angle of the first camera module is comprised in the viewing angle of the second camera module such that there is an overlapping area between the first image and the second image so as to enable a composite image formed by combining the first image and the second image to be generated, wherein the first camera module performs an AF function by activating the first lens module to an optical axis direction, and a focal length of the second camera module varies in response to a distance between the second liquid lens and a subject when the second camera module is focused.

A focal length of the second liquid lens may be shortened as a subject approaches the second liquid lens.

The first and second camera modules may simultaneously perform the AF function.

An optical device according to an exemplary embodiment may comprise:

a first camera module comprising a first lens module operated by a first lens driving device and capturing a first image;

a second camera module comprising a second liquid lens and capturing a second image, and a controller generating a composite image by combining the first image and the second image, wherein a viewing angle of the first camera module is smaller than a viewing angle of the second camera module, at least a part of the viewing angle of the first camera module is comprised in the viewing angle of the second camera module such that there is an overlapping area between the first image and the second image so as to enable a composite image formed by combining the first image and the second image to be generated, and the first lens module is operated to an optical axis direction to perform an AF when the first camera module is focused, and a focal length of the second liquid lens is varied according to the distance between the second liquid lens and the subject when the second camera module is focused, and wherein the controller is such that resolution of the composite image may be increased while being decreased when magnification of the composite image is enlarged by digital-zooming the composite image about a center of overlapped area.

An optical device according to an exemplary embodiment may comprise:

a first camera module comprising a first lens module operated by a first lens driving device and capturing a first image;

a second camera module comprising a second liquid lens and capturing a second image, a viewing angle of the second camera module is smaller than a viewing angle of the first camera module, at least a part of the viewing angle of the second camera module is comprised in the viewing angle of the first camera module such that there is an overlapping area between the first image and the second image so as to enable a composite image formed by combining the first image and the second image to be generated, and the first lens module performs an AF function when the first camera module is operated to an optical axis direction, and a focal length of the second liquid lens is varied according to the distance between the second liquid lens and the subject when the second camera module is focused, The first camera module may comprise a first cover member accommodating the first lens module, the second camera module may comprise a second cover member accommodating the second liquid lens, the first cover member may comprise a first upper plate forming an upper surface of the first cover member and a first lateral plate forming a lateral surface, and the second cover member may comprise a second upper plate forming an upper surface of the second cover member and a second lateral plate forming a lateral surface, and an area of the first upper plate and an area of the second upper plate may be mutually different.

An area of the first upper plate may be narrower than an area of the second upper plate.

The first camera module may comprise a first cover member accommodating the first lens module, the second camera module may comprise a second cover member accommodating the second liquid lens, the first cover member may comprise a first upper plate forming a an upper surface of the first cover member and a first lateral plate forming a lateral surface, and the second cover member may comprise a second upper plate forming an upper surface of the second cover member and a second lateral plate forming a lateral surface, and an area of the first upper plate and an area of the second upper plate may be mutually different.

An area of the first upper plate may be broader than an area of the second upper plate.

A dual camera module according to an exemplary embodiment may comprise:

a first camera module; and a second camera module adjacently disposed to the first camera module, wherein the first camera module may comprise: a first cover member; a first lens holder disposed at an inside of the first cover member and comprising at least one lens; a first liquid lens coupled with the first lens holder; a first substrate electrically connected to the first liquid lens; and a first image sensor disposed on an optical axis direction of the first liquid lens and mounted on the first substrate, and wherein the second camera module may comprise:

a second cover member; a second lens holder disposed at an inside of the second cover member and comprising at least one lens; a second liquid lens coupled with the second lens holder; a second substrate electrically connected to the second liquid lens; and a second image sensor disposed on an optical axis direction of the second liquid lens and mounted on the second substrate.

The first lateral surface of the first cover member may be oppositely disposed to the second lateral surface of the second cover member, and a shortest distance between the first lateral surface of the first cover member and the second lateral surface of the second cover member may be smaller than a width of at least one image sensor of the first image sensor and the second image sensor.

The first lateral surface of the first cover member may be oppositely disposed to the second lateral surface of the second cover member, and a shortest distance between the first lateral surface of the first cover member and the second lateral surface of the second cover member may be less than 2 mm.

The first liquid lens may be disposed at an inside or at an upper surface of the first lens holder, and the second liquid lens may be disposed at an inside or an upper surface of the second lens holder.

The first liquid lens may comprise a first core plate formed with a first cavity accommodated with a first liquid and a second liquid forming a first interface by being mutually abutted; and a first electrode part disposed on the first core plate, and the second liquid lens may comprise a second core plate formed with a second cavity accommodated with a third liquid and a fourth liquid forming a second interface by being mutually abutted, and a second electrode part disposed on the second core plate.

At least a part of the electrode part may comprise a first electrode and a second electrode disposed on the first core plate and having a gap by being mutually spaced apart, and may further comprise a first insulation layer disposed on the first cavity and stacked on the first electrode part, and at least a part of the second electrode part may comprise a third electrode and a fourth electrode disposed on the second core plate and having a gap by being mutually spaced apart, and may further comprise a second insulation layer disposed on the second cavity and stacked on the second electrode layer.

A lateral surface of the first cover member may abut to a second lateral surface of the second cover member.

The first lateral surface of the first cover member and the second lateral surface of the second cover member may be bond-coupled by an adhesive material.

The first substrate and the second substrate may be integrally formed.

The first cover member and the second cover member may be integrally formed to share an inner space, and a shortest distance between the first lens holder and the second lens holder may be smaller than a width of at least one image sensor of the first image sensor and the second image sensor.

The first cover member and the second cover member may be integrally formed to share an inner space, and a shortest distance between the first lens holder and the second lens holder may be less than 2 mm.

The first lens holder and the second lens holder may be integrally formed, and a shortest distance between the first liquid lens and the second liquid lens may be smaller than a width of at least one image sensor of the first image sensor and the second image sensor.

The first lens holder and the second lens holder may be integrally formed, and a shortest distance between the first liquid lens and the second liquid lens may be less than 2 mm.

The first liquid lens and the second liquid lens may be integrally formed.

The optical device may comprise a first camera module and a second camera module adjacent to the first camera module, wherein the first camera module may comprise a first cover member; a first lens driving device disposed at an inside of the first cover member and comprising a first magnet and a first coil part; a first lens module coupled to the first lens driving device; a first substrate electrically connected to the first lens driving device; a first image sensor disposed on an optical axis direction of the first lens module and mounted on the first substrate, and the second camera module may comprise a second cover member; a second lens holder disposed at an inside of the second cover member and comprising at least one lens; a second liquid lens coupled with the second lens holder; a second substrate electrically connected to the second liquid lens; and a second image sensor disposed on an optical axis direction of the second liquid lens and mounted on the second substrate.

The first lateral surface of the first cover member may be oppositely disposed to the second lateral surface of the second cover member, and a shortest distance between the first lateral surface of the first cover member and the second lateral surface of the second cover member may be shorter than a width of at least one image sensor of the first image sensor and the second image sensor.

The first lateral surface of the first cover member may be oppositely disposed to the second lateral surface of the second cover member, and a shortest distance between the first lateral surface of the first cover member and the second lateral surface of the second cover member may be less than 2 mm.

The first lateral surface of the first cover member and the second lateral surface of the second cover member may be abutted.

The first lateral surface of the first cover member and the second lateral surface of the second cover member may be bond-coupled by an adhesive material.

The first substrate and the second substrate may be integrally formed.

The second liquid lens may be disposed at an inside or an upper surface of the second lens holder.

The first camera module may further comprise a first compensation cover member disposed at an inside of the first cover member and accommodating the first lens driving device, wherein the first cover member and the second cover member may be integrally formed to share an inner space, and a shortest distance between the first compensation cover member and the second lens holder may be smaller than a width of at least one image sensor of the first image sensor and the second image sensor.

The first camera module may further comprise a first compensation cover member disposed at an inside of the first cover member and accommodating the first lens driving device, and the first cover member and the second cover member may be integrally formed to share an inner space, and a shortest distance between the first compensation cover member and the second holder may be less than 2 mm.

The optical device may comprise:

a lens holder module comprising a first lens part and a second lens part;

a substrate disposed at a lower surface of the lens holder module;

a first image sensor mounted on the substrate and disposed at a lower surface of the first lens part and a second image sensor disposed at a lower surface of the second lens part;

a liquid lens comprising a first cavity and a second cavity coupled with the lens holder module and spaced apart to be accommodated with a liquid; and a cover member accommodated therein with the lens holder module and the liquid lens, wherein the first cavity may be disposed on an optical axis of the first lens part and the second cavity may be disposed on an optical axis of the second lens part.

The optical device may comprise:

a lens holder module comprising a first lens part and a second lens part;

a substrate disposed at a lower surface of lens holder module;

a first image sensor mounted on the substrate and disposed at a lower surface first lens part and a second image sensor disposed at a lower surface of second lens part;

a liquid lens coupled with the lens holder module; and a cover member accommodating the lens holder module and the liquid lens, wherein the liquid lens may comprise a first liquid lens disposed at an upper surface of the first image sensor and a second liquid lens disposed at an upper surface of second image sensor, and wherein the liquid lens may comprise first and second cavities, each spaced apart, and the first liquid lens and the second liquid lens may be formed on one single plate.

An optical device may comprise:

a first camera module and a second camera module disposed adjacently to the first camera module; and a cover member accommodating therein the first camera module and the second camera module, wherein the first camera module may comprise:

a first lens holder comprising at least one lens;

a first liquid lens coupled with the first lens holder;

a first substrate electrically connected to the first liquid lens; and a first image sensor disposed on an optical axis direction of the first liquid lens and mounted on the first substrate, and wherein the second camera module may comprise:

a second lens driving device comprising a second magnet and a second coil;

a second lens module coupled with the second lens driving device;

a second substrate electrically connected to the second lens driving device;

a second image sensor disposed on an optical axis direction of the second lens module and mounted on the second substrate; and wherein a viewing angle of the first camera module may be narrower than that of the second camera module.

A camera module according to an exemplary embodiment may comprise:

a first lens module comprising a first liquid lens comprising two or more liquids to form a first interface and at least one solid lens;

a second lens module comprising a second liquid lens comprising two or more liquids to form a second interface and at least one solid lens; and a driving part generating a driving signal to controllably drive the first lens module and the second lens module, wherein a same signal generated from the driving part is transmitted to the first liquid lens and the second liquid lens, and wherein the first lens module and the second lens module may have a mutually different viewing angle.

A camera module according to an exemplary embodiment may comprise:

a first lens module comprising a first liquid lens comprising two or more liquids to form a first interface and at least one solid lens;

a second lens module comprising a second liquid lens comprising two or more liquids to form a second interface and at least one solid lens;

a driving part generating a driving signal to controllably drive the first lens module and the second lens module; and a switching part selectively transmitting the signal generated from the driving part to any one liquid lens of the first liquid lens and the second liquid lens, wherein the first lens module and the second lens module may have a mutually different viewing angle.

The driving part may comprise a sensor module measuring a position and a direction;

an OIS (Optical Image Stabilization) controller performing an OIS function by allowing the first interface and the second interface to be changed;

a voltage driver outputting a voltage for driving the first liquid lens and the second liquid lens; and a clock module generating a clock for performing a synchronization with the first lens module and the second lens module.

The transmission of the same signal generated from the driving part to the first liquid lens and the second liquid lens may mean transmission of same voltage value outputted from a voltage driver within a driving part to the first liquid lens and the second liquid lens, wherein the first lens module and the second lens module may have a same focus.

The driving part may comprise a sensor module measuring a position and a direction;

an OIS (Optical Image Stabilization) controller performing an OIS function by allowing the first interface and the second interface to be changed;

a voltage driver outputting a voltage for driving the first liquid lens and the second liquid lens;

a clock module generating a clock for performing a synchronization with the first lens module and the second lens module; and a controller repeating, for a preset time, an operation of opening any one switch of two switches comprised in the switching part and short-circuiting the other switch.

The first liquid lens may comprise two more liquids forming the first interface and adjusting a shape of the first interface by receiving a voltage, and the second liquid lens may comprise two or more liquids and adjusting a shape of the first interface by receiving a voltage.

A method for operating a camera module according to an exemplary embodiment may comprise:

adjusting, by a first lens module, a shape of a first interface by comprising two or more liquids forming the first interface and receiving a voltage;

adjusting, by a second lens module, a shape of a second interface by comprising two or more liquids forming the second interface and receiving a voltage;

generating, by a driving part, a signal controlling the driving of the first lens module and the second lens module; and transmitting the same signal generated from the driving part to the first liquid lens and the second liquid lens, wherein the first lens module and the second lens module may have a mutually different viewing angle.

A method for operating a camera module according to an exemplary embodiment may comprise:

adjusting, by a first lens module, a shape of a first interface by comprising two or more liquids forming the first interface and receiving a voltage;

adjusting, by a second lens module, a shape of a second interface by comprising two or more liquids forming the second interface and receiving a voltage;

generating, by a driving part, a signal controlling the driving of the first lens module and the second lens module; and selectively transmitting, by a switching part, a signal generated from the driving part to any one liquid lens of the first liquid lens and the second liquid lens, wherein the first lens module and the second lens module may have a mutually different viewing angle.

The step of generating, by the driving part, a signal for controlling the driving of the first lens module and the second lens module may comprise:

measuring, by a sensor module, a position and direction;

performing, by an OIS controller, an OIS function by allowing the first interface and the second interface to be changed;

outputting, by a voltage driver, a voltage for driving the first liquid lens and the second liquid lens; and generating, by a clock module, a clock signal for performing a synchronization with the first lens module and the second lens module.

The transmission of the same signal generated from the driving part to the first liquid lens and the second liquid lens may mean transmission of same voltage value outputted from a voltage driver within a driving part to the first liquid lens and the second liquid lens, wherein the first lens module and the second lens module may have a same focus.

The step of generating, by the driving part, a signal for controlling the driving of the first lens module and the second lens module may comprise:

measuring, by a sensor module, a position and direction;

performing, by an OIS controller, an OIS function by allowing the first interface and the second interface to be changed;

outputting, by a voltage driver, a voltage for driving the first liquid lens and the second liquid lens;

generating, by a clock module, a clock signal for performing a synchronization with the first lens module and the second lens module; and repeating for a preset time, by a controller, a step of opening any one switch of two switches comprised in a switching part, and short-circuiting the other switch.

The first liquid lens may comprise two or more liquids forming a first interface to adjust a shape of the first interface by receiving a voltage, and the second liquid lens may comprise two or more liquids forming a second interface to adjust a shape of the first interface by receiving a voltage.

Advantageous Effects

The dual camera module according to an exemplary embodiment is a camera module generating a composite image having a high resolution or a high resolving power and a high MTF (Modulation Transfer Function) by combining two or more images captured by each single camera module by comprising two single camera modules. Thus, each of the single camera modules is required to be proximately disposed. This is because, when each single camera module is spaced apart, a viewing difference grows greater to disable an image matching to be smoothly realized.

The dual camera module according to an exemplary embodiment can perform an AF function and an OIS function without mutual electromagnetic interference because a liquid lens camera module is used on at least one of the first camera module and a second camera module and additionally allow a proximate arrangement of camera modules. Furthermore, parts forming a dual camera module are minimized to enable the formation of a compact structure.

The present exemplary embodiments have an advantageous effect of performing an AF and an OIS function using a single hardware by disposing a switching part between two camera modules and opening or short-circuiting the switching part.

The present exemplary embodiments have an advantageous effect of reducing the volume of a camera and the manufacturing cost by operating a dual camera using a single hardware and by switching a switch of a switching part connecting a driving part and two camera modules.

BRIEF DESCRIPTION OF DRAWINGS

FIG. 34 is a flowchart illustrating a second operational order of a camera module according to a fourth exemplary embodiment of the present invention.

BEST MODE

Figure 1:
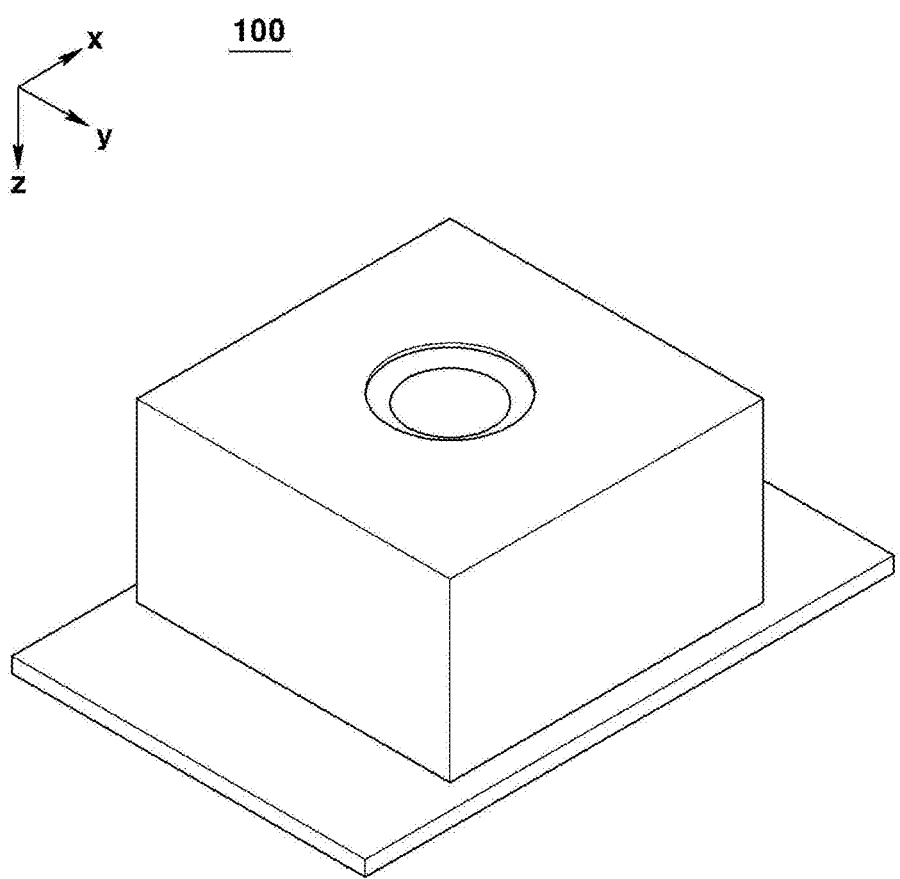
FIG. 1 is a perspective view illustrating a liquid lens camera module.

Some exemplary embodiments of present invention will be described in detail with reference to the accompanying drawings. In describing a reference numeral for each element, a same reference numeral will be designated, if possible, for the same element, albeit being differently indicated on other drawings. Furthermore, a detailed explanation of some elements will be omitted while being explained in the exemplary embodiments of the present invention if obstructed in the understanding of the exemplary embodiment of present invention.

In describing elements in the exemplary embodiments of the present invention, the terms, first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

The term of 'MTF (Modulation Transfer Function) used hereinafter is an indicator to evaluate an image quality where expression of a high spatial frequency or a strong contrast may be an important object of measurement. A higher MTF of an image is evaluated as being excellent in resolution of spatial frequency and transfer of contrast.

The term of 'AF (Auto Focus) function' used hereinafter may be defined as a function of adjusting a focus by moving a lens module of a lens driving device to an optical axis direction or changing an interface of a liquid lens in response to a discrete distance to a subject.

The term of 'OIS (Optical Image Stabilization)' used hereinafter may be defined as a function of moving or tilting a lens module of a lens driving device to a direction perpendicular to an optical axis in order to offset a vibration (movement) generated by an external force.

Hereinafter, x axis direction illustrated on drawings may be defined as a back and forth direction. In this case, an arrow direction of x axis may be a rear (back) side. y axis direction illustrated on drawings may be defined as a left and right direction. In this case, an arrow direction of y axis may be a right side.

z axis direction illustrated on drawings may be defined as a up and down direction. In this case, an arrow direction of z axis may be a lower side. The z axis direction may be interchangeably used with an optical axis direction.

Now, configuration of liquid lens camera module (100) will be described with reference to the accompanying drawings.

Figure 2:
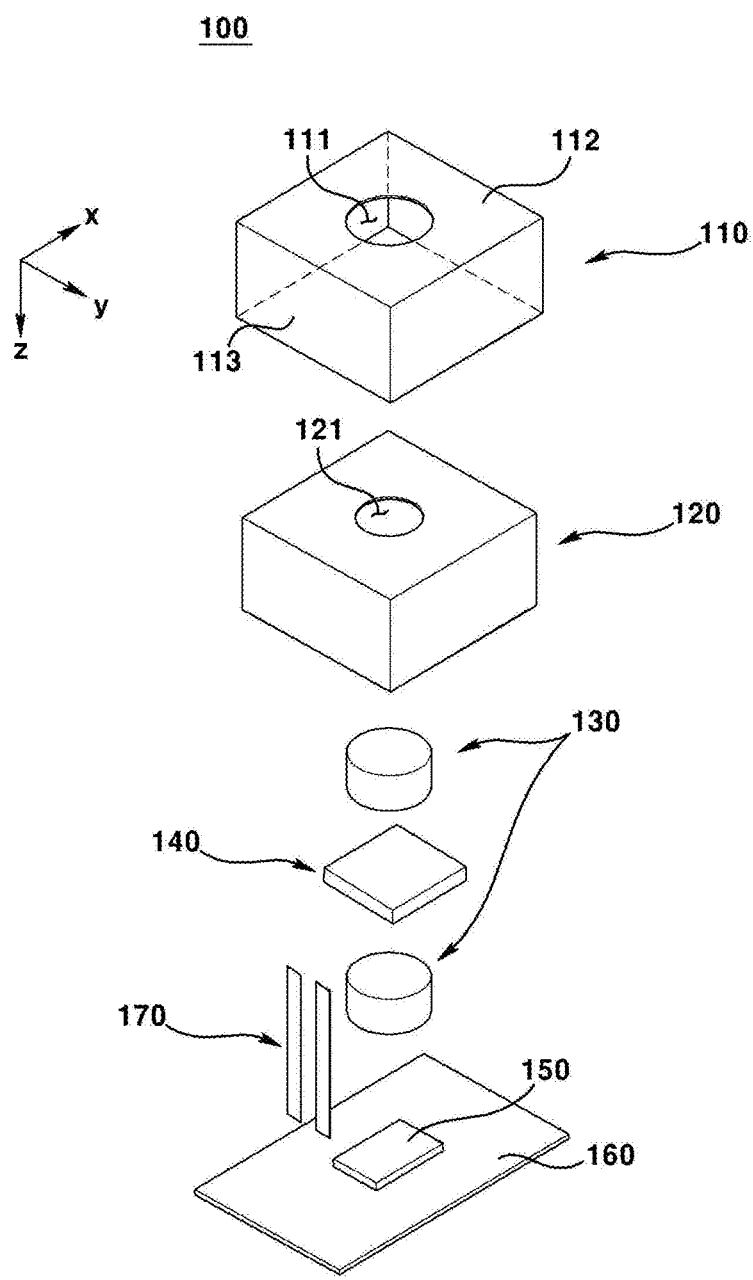
FIG. 2 is an exploded perspective view illustrating a liquid lens camera module.
Figure 3:
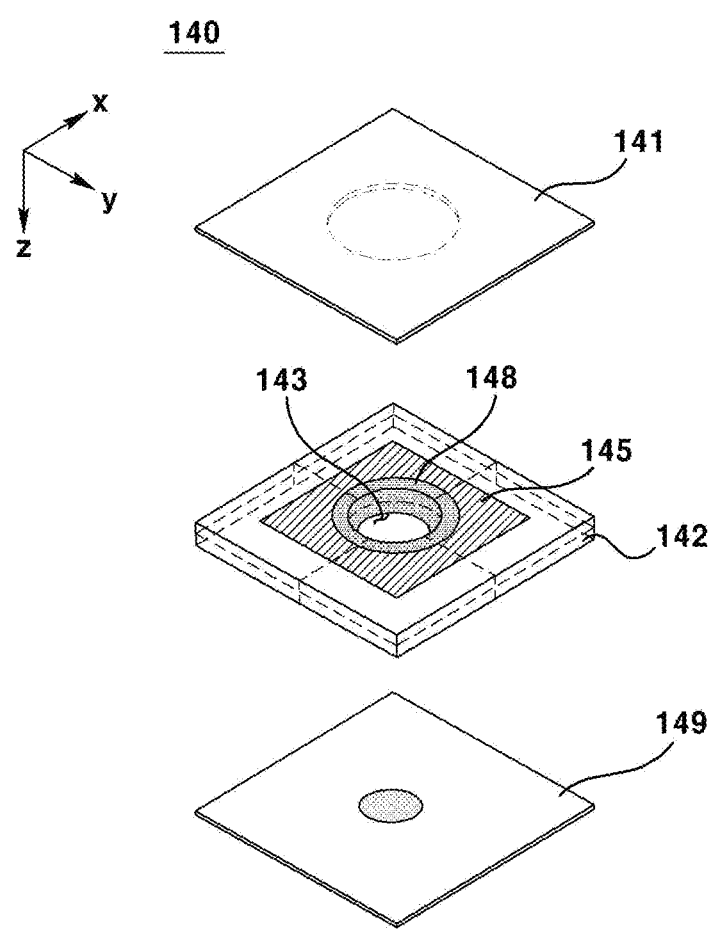
FIG. 3 is an exploded perspective view illustrating a liquid lens.
Figure 4:
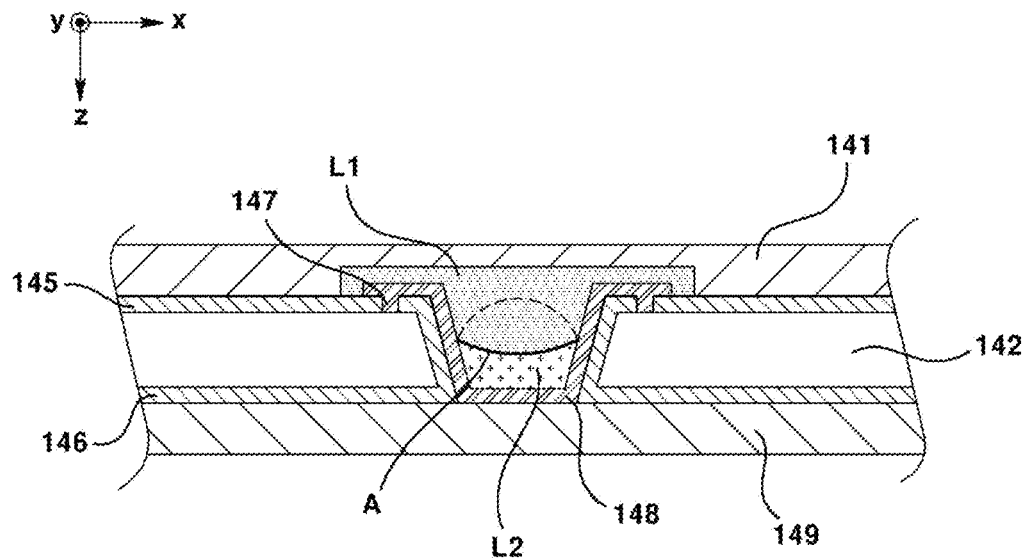
FIG. 4 is a cross-sectional view illustrating a liquid lens.

The liquid lens camera module (100) may be used as first and second camera modules (1, 2) of a dual camera module (1000) according to a first exemplary embodiment, may be used as a second camera module (2) of a dual camera module (2000) according to a second exemplary embodiment, and may be used as a first camera module (1) of a dual camera module (3000) according to a third exemplary embodiment. FIG. 1 is a perspective view illustrating a liquid lens camera module, FIG. 2 is an exploded perspective view illustrating a liquid lens camera module, FIG. 3 is an exploded perspective view illustrating a liquid lens, and FIG. 4 is a cross-sectional view illustrating a liquid lens.

Hereinafter, structure of liquid lens camera module (100) will be described.

The liquid lens camera module (100) may comprise a cover member (110), a lens holder (120), a lens (130), a liquid lens (140), an image sensor (150) and a substrate (160).

The cover member (110) may be an external member. The cover member (110) may be made of a metal material. In this case, the cover member (110) may shield an EMI (Electro Magnetic Interference). That is, the cover member (110) may inhibit an external electromagnetic wave from being introduced thereinto. Furthermore, an electromagnetic wave generated from inside of the cover member (100) may be inhibited from being emitted to outside.

The cover member (110) may take a hollowed block shape. The cover member (110) may comprise a rear lateral surface (112). The rear lateral surface (112) may be a lateral surface disposed at a rear side of cover member (110). The cover member (110) may comprise a front lateral surface (113). The front lateral surface (113) may be a lateral surface disposed at a front side of cover member (110). However, the shape of cover member (110) is not limited thereto, and any shape configured to cover a lens holder (120) may be applicable.

The cover member (110) may comprise an upper plate formed with a transmittance window (111) and a lateral plate downwardly extended from the upper plate. The lateral plate may comprise a front lateral surface (113) or a rear lateral surface (112). The front lateral surface (113) and the rear lateral surface (112) may face each other and may be formed in parallel. The upper plate or lateral plate can be coupled to a lens holder (120) or to a substrate (170).

An upper surface of cover member (110) may be formed with the transmittance window (111). The transmittance window (111) may be aligned with an optical axis of a circular opened liquid lens (140, described later). As a result, a light that has reflected a subject may be moved to the lens (130) and the liquid lens (140) after passing through the transmittance window (111). A bottom surface of cover member (110) may be opened to form an opening. An inside of the cover member (110) may be disposed with a lens holder (120). The inside of cover member (110) may be accommodated with the lens holder (120). The cover member (110) may be supported by a substrate (170, described later). The cover member (110) may be fixed by being coupled with the substrate (170). In this case, the substrate (170) may close an opening formed at a bottom surface of cover member (110).

The lens holder (120) may be disposed at an inside of the cover member (110). The lens holder (120) may take a block shape formed at a center with a lens hole (121). The lens holder (120) may comprise at least one lens. The lens hole (121) may be formed by penetrating the lens holder (120) to an optical axis direction. The lens hole (121) may be accommodated with a lens module (130) and/or a liquid lens (140). The lens module (130) may comprise at least one lens. However, the shape of lens holder (120) is not limited thereto, and may comprise any shape configured to accommodate a lens (130) and/or liquid lens (140). In an exemplary embodiment, the lens module (130) may accommodate a lens barrel comprising at least one lens. Furthermore, the lens module (130) and the lens barrel may be integrally formed to allow the lens module (130) to be disposed or coupled with at least one lens without a lens barrel.

The liquid lens (140) may be a variable focus lens in which a shape of liquid or a shape of interface between two types of liquids is varied by electro-wetting phenomenon. The liquid lens (140) may be accommodated into a lens hole (121) at an inside of the lens holder (120) or may be disposed at an upper surface or a lower surface of lens holder (120). The liquid lens (140) may be accommodated into the lens holder (120) by being coupled to the lens holder (120). The liquid lens (140) may be disposed at a middle section of the lens hole (120). That is, the liquid lens (140) may be inserted into a plurality of lenses of the lens module (130). The liquid lens (140) may be disposed on an upper surface of lens holder (120). That is, the liquid lens (140) may be disposed on an upper surface of plurality of lenses at the lens module (130). The liquid lens (140) may be connected to a substrate (160). Thus, the liquid lens (140) may receive a current from the substrate (160). The liquid lens (140) may comprise an upper cover (141), a core plate (142), a cavity (143), an electrode part (144), an insulation layer (148) and a lower cover (149).

The upper cover (141) may be disposed on an upper surface of core plate (142). The upper cover (141) may be coupled with the core plate (142). A bottom surface of the upper cover (141) and an upper surface of core plate (142) may be mutually abutted. Thus, the upper cover (141) can close an upper surface of cavity (143). Furthermore, an electrode part (144) and/or insulation layer (148) may be interposed between the upper cover (141) and the core plate (142). The material of upper cover (141) may be non-conductive. The material of upper cover (141) may be glass. The upper cover (141) may take a plate shape. A groove may be formed at a lower center of upper cover (141). The groove of the upper cover (141) may communicate with the cavity (143). As a result, a first liquid (L1) disposed on an upper surface of cavity (143) may be filled in the groove of the upper cover (141).

The core plate (142) may take a plate shape having a thickness and may be formed at a center with a cavity (143). The core plate (142) may be formed on an optical axis with a cavity (143). The cavity (143) may be disposed on a light path of the liquid lens camera module (100). The cavity (143) may vertically penetrate the core plate (142). A horizontal cross-section of cavity (143) may be round. The horizontal cross-section of cavity (143) may taper off downwardly. That is, the cavity (143) may be inclined. Furthermore, the cavity may be reversely formed to allow a horizontal cross-section of the cavity (143) to taper off upwardly. The cavity (143) may be accommodated with a first liquid (L1) and a second liquid (L2). The first liquid (L1) and the second liquid (L2) may not be intermixed. The first liquid (L1) may be a conductive liquid. The first liquid (L1) may be water. The second liquid (L2) may be non-conductive liquid. The second liquid (L2) may be oil. The second liquid (L2) may be silicone. The first liquid (L1) and the second liquid (L2) may be mutually different or same in terms of specific gravity. Hence, influence of gravity affecting on the first liquid (L1) and the second liquid (L2) in the cavity (143) may be insignificant. Furthermore, the surface tension of the first liquid (L1) and the second liquid (L2) in the cavity (143) may overrule the gravity. The first liquid (L1) and the second liquid (L2) may be mutually contacted to form a first interface (A). The first liquid (L1) may be disposed on an upper surface of second liquid (L2). That is, the first liquid (L1) and the second liquid (L2) may be vertically separated to form the first interface (156).

The electrode part (144) may be disposed on the core plate (142). At least a portion of the electrode part (144) may be disposed on the core plate (142). The electrode part (144) may be an electrode material coated on the core plate (142). The electrode part (144) may comprise a first electrode (145) and a second electrode (146). The first electrode (145) may be disposed on an upper surface of core plate (142). The second electrode (146) may be disposed at an inner wall of the cavity (143) at the core plate (142). The second electrode (146) may be disposed on a bottom surface of core plate (142), an inner surface of cavity (143) and an upper surface of core plate (142). The second electrode (146) may be disposed by being connected at a bottom surface of core plate (142) and an inner surface of cavity (143) to a surrounding of cavity (143). The first electrode (145) and the second electrode (146) may not be mutually contacted. As a result, an upper surface of core plate (142) may be formed with a gap (147). The gap (147) may be disposed with an insulation material. The first electrode (145) may be formed with an electrically-connected one sector. Furthermore, the first electrode (145) may be formed by being separated with a plurality of sectors. The first electrode (145) and the second electrode (146) may be mutually spaced apart to allow forming an insulation layer (148) between the first electrode (145) and the second electrode (146).

The first electrode (145) may be separated into two or four sectors. The first electrode (145) may be separated into four sectors each symmetrical to front/rear/left/right sides about a center of the core plate (142). The second electrode (146) may be formed by being separated into a plurality of sectors more than one or two sectors. The second electrode (146) may be separated into four sectors. The second electrode (146) may be separated into four sectors each symmetrical to front/rear/left/right sides about a center of the core plate (142). The first electrode and the second electrode (145,146) may be electrically connected to a substrate (160). Electricity may be so supplied as to allow the polarity of first and second electrodes (145,146) to be mutually opposite. Moreover, electricity may be supplied only to one electrode of the first and second electrodes (145,146). In addition, the intensity of supplied electricity may be adjusted.

The insulation layer (148) may be disposed on the electrode part (144). The insulation part (148) may be stacked on the electrode part (144). The insulation layer (148) may be stacked on at least a portion of the electrode part (144). The insulation layer (148) may be disposed on a portion of the lower cover (149). The insulation layer (148) may be radially extended from a circumference of cavity (143) at an upper surface of core plate (142) to be disposed on the first electrode (145) and the second electrode (146). The insulation layer (148) may be radially extended from a circumference of cavity (143) at an upper surface of core plate (142) to be stacked on the first electrode (145) and the second electrode (146).

The insulation layer (148) may be disposed on the second electrode (146) along an inner surface of cavity (143). The insulation layer (148) may be stacked on the second electrode (146) along an inner surface of cavity (143). The insulation layer (148) may be disposed on an area opposite to the cavity (143) from an upper surface of lower cover (149). The insulation layer (148) may be a coated insulation material. The insulation layer (148) may be integrally stacked on the first and second electrodes (145, 146) and may be disposed on the lower cover (149). Hence, the insulation layer (148) may take a basket shape to accommodate the first liquid (L1) and the second liquid (L2). Furthermore, the insulation layer (148) may be interposed between the second electrode (146) and the first liquid and second liquid (L1, L2). However, the insulation layer (148) stacked on an upper surface of core plate (142) may not be radially extended to outside of the groove formed on the upper cover (141) such that the first liquid (L1) filled in the groove of the upper cover (141) may be brought into contact with the first electrode (145). As a result, when a power is supplied to the electrode part (144), there may be generated an electro-wetting phenomenon of the first liquid (L1). Thus, the shape of interface (A) of first liquid (L1) and the second liquid (L2) under meniscus state may be changed.

The lower cover (149) may be disposed at a lower surface of core plate (142). The lower cover (149) may be coupled with the core plate (142). An upper surface of lower cover (149) and a lower surface of core plate (142) may be brought into contact or mutually coupled. The upper surface of lower cover (149) and the lower surface of core plate (142) may be coupled and contacted by being fused or bonded. Thus, the lower cover (149) can close a lower side of cavity (143). The material of lower cover (149) may be non-conductive. The material of lower cover (149) may be glass. The lower cover (149) may take a plate shape.

The image sensor (150) may be dispose on an upper surface of substrate (160). The image sensor (150) may be mounted on the substrate (160). The image sensor (150) may be disposed on an optical axis of liquid lens (140). Thus, the image sensor (150) can obtain a light having passed the liquid lens (140). The image sensor (160) can convert the irradiated light to an image. The image may be a broad concept that comprises not only a light signal-converted digital signal but also a result in which the digital signal is outputted as a light visualized through a display device. The image sensor (150) may be a CCD (charge coupled device), a MOS (metal oxide semi-conductor), a CPD and a CID. However, the type of image sensor (150) is not limited thereto.

The substrate (160) may be a PCB (Printed Circuit Board). The substrate (160) may be disposed at a lower side of cover member (110). In this case, the substrate (160) may close a bottom opening of cover member (110). Furthermore, the substrate (160) may support the cover member (100). The substrate (160) may be electrically connected to the liquid lens (140). The substrate (160) may be electrically connected to the liquid lens (140) by a connection substrate (170). In this case, the connection substrate (170) may be a flexible PCB (FPCB, Flexible Printed Circuit Board). In this case, the substrate (160) may apply electricity to the electrode part (144). The substrate (160) may be mounted with an image sensor (150). In this case, the substrate (160) may receive an image generated by the image sensor (150).

Now, operation and effect of liquid lens camera module (100) will be described.

The liquid lens camera module (100) may perform an AF function and/or an OIS function.

The liquid lens camera module (100) may perform an AF function by allowing a shape of an interface (A) to be changed. The substrate (160) may change the shape of interface (A) by applying a power to the electrode part (144). When a power is so applied as to allow the first electrode (145) and the second electrode (146) to have a mutually different polarity, the shape of interface (A) may be changed by the electro-wetting phenomenon. In this case, the curvature of interface (A) may be changed. Furthermore, the curvature of interface (A) can be changed by adjusting intensity of applied power.

When the curvature of interface (A) of liquid lens (140) is changed, a focal length of the liquid lens (140) may be changed. As a result, the liquid lens camera module (100) may perform an AF function by allowing changing a focal length of liquid lens (140) in response to a distance between the liquid lens (140) and a subject. The focal length may be defined by an effective focal length, which is a distance from an optical center (second focus) of liquid lens (140) to a focus (image sensor 150). The focal length of liquid lens (140) may be shortened as a subject comes near to the liquid lens (140). The liquid lens camera module (100) can capture an image with a high MTF value regardless of discrete distance to a subject through the AF function by adjusting a focus.

The liquid lens camera module (100) can perform an OIS function by allowing a shape of the interface (A) to be changed. The substrate (160) can change the shape of the interface (A) by applying a power to the electrode part (144). When the first electrode (145) applies a power by varying a voltage for each sector, and the second electrode (146) applies a power to all sectors with an equal voltage, the interface (A) may be changed by the electro-wetting phenomenon. In this case, a center of the interface (A) may be vertically biased to an optical axis direction. That is, the interface (A) may generate an effect of being tinted. Furthermore, a degree of the center of interface (A) being biased can be adjusted by adjusting the intensity of applied voltage. As a result, the shaking of the liquid lens camera module (100) can be corrected. The liquid lens camera module (100) can capture an image with a high MTF value through the OIS function by correcting the shake caused by an external force.

When the liquid lens camera module (100) is used as a first camera module (1) of a dual camera module (1000, 3000) according to first and third exemplary embodiments, the cover member (110) may be called as a "first cover member", the transmittance window (111) as a "first transmittance window", the rear lateral surface (112) as a "first lateral surface", the front lateral surface (113) as a "first front lateral surface", the lens holder (120) as a "first lens holder", the lens hole (121) as a "first lens hole", the lens module (130) as a "first lens module", the liquid lens (140) as a "first liquid lens", the upper cover (141) as a "first upper cover", the core plate (142) as a "first core plate", the cavity (143) as a "first cavity", the electrode part (144) as a "first electrode part", the first and second electrodes (145, 146) remaining unchanged, the gap (147) as a "first gap", the insulation layer (148) as a "first insulation layer", the first and second liquids (L1,L2) remaining unchanged, the interface (A) as a "first interface", the lower cover (149) as a "first lower cover", the image sensor (150) as a "first image sensor", and the substrate (160) may be called as a "first substrate".

When the liquid lens camera module (100) is used as a second camera module (2) of a dual camera module (1000, 2000) according to first and second exemplary embodiments, the cover member (110) may be called as a "second cover member", the transmittance window (111) as a "second transmittance window", the rear lateral surface (112) as a "second lateral surface", the front lateral surface (113) as a "second front lateral surface", the lens holder (120) as a "second lens holder", the lens hole (121) as a "second lens hole", the lens module (130) as a "second lens module", the liquid lens (140) as a "second liquid lens", the upper cover (141) as a "second upper cover", the core plate (142) as a "second core plate", the cavity (143) as a "second cavity", the electrode part (144) as a "second electrode part", the first electrode (145) as a "third electrode", the second electrode (146) as a "fourth electrode", the gap (147) as a "second gap", the insulation layer (148) as a "second insulation layer", the first liquid (L1) as a "third liquid (L2), the second liquid (L2) as a "fourth liquid", the interface (A) as a "second interface", the lower cover (149) as a "second lower cover", the image sensor (150) as a "second image sensor", and the substrate (160) may be called as a "second substrate".

Hereinafter, a driving camera module (100) will be described with reference to the accompanying drawings.

The driving camera module (100) may be used as a first camera module (1) of a dual camera module (2000) according to the second exemplary embodiment, and may be used as a second camera module (2) of a dual camera module (3000) according to the third exemplary embodiment.

Figure 5:
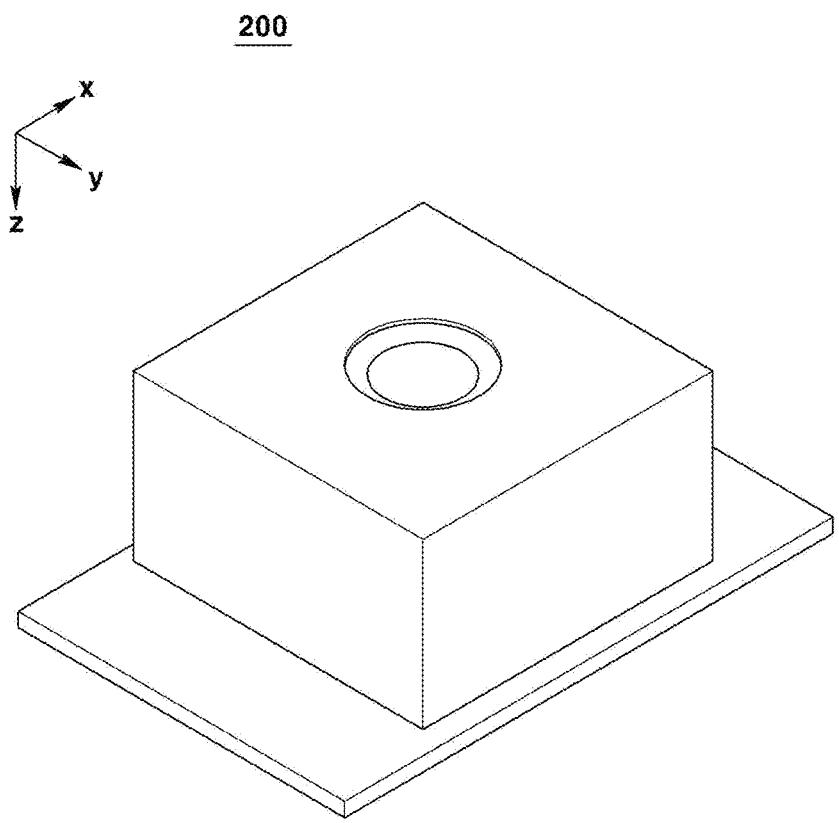
FIG. 5 is a perspective view illustrating a driving camera module.
Figure 6:
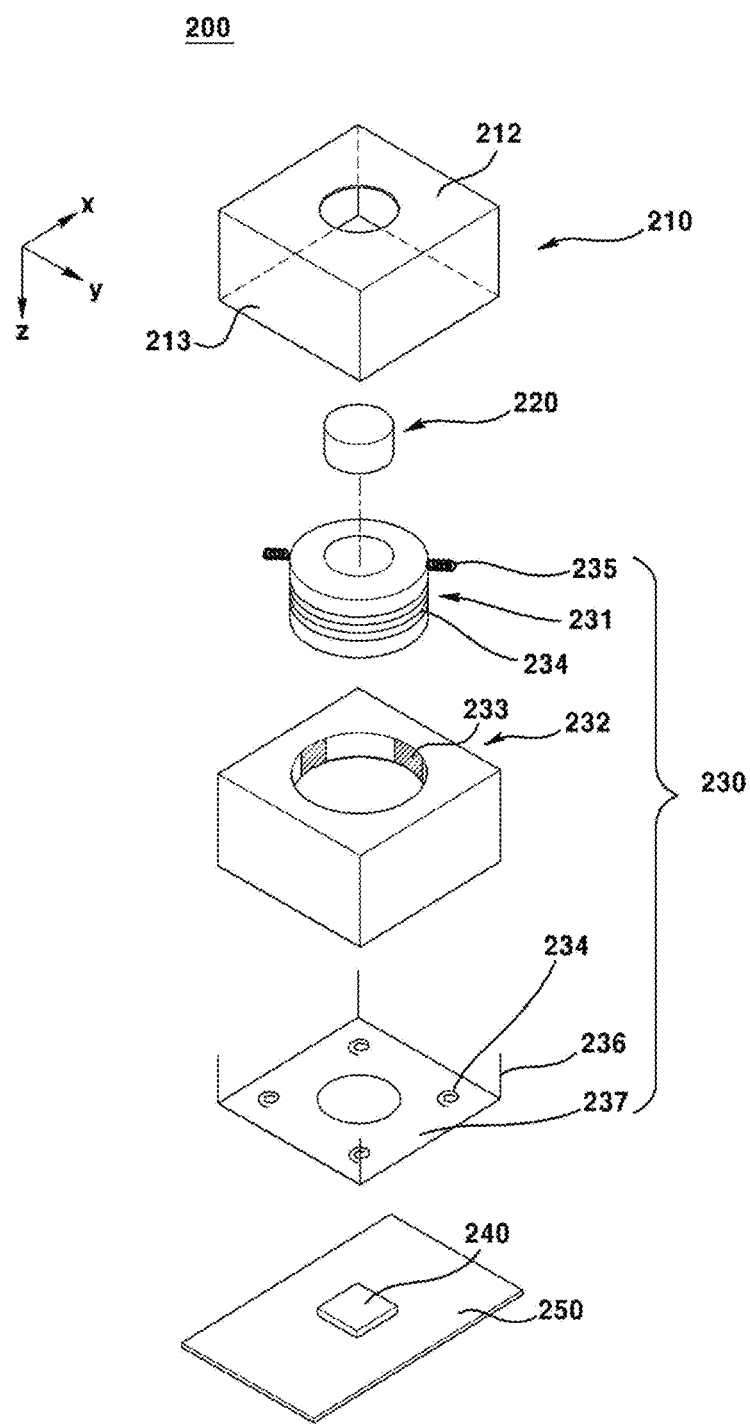
FIG. 6 is an exploded perspective view illustrating a driving camera module.
Figure 7:
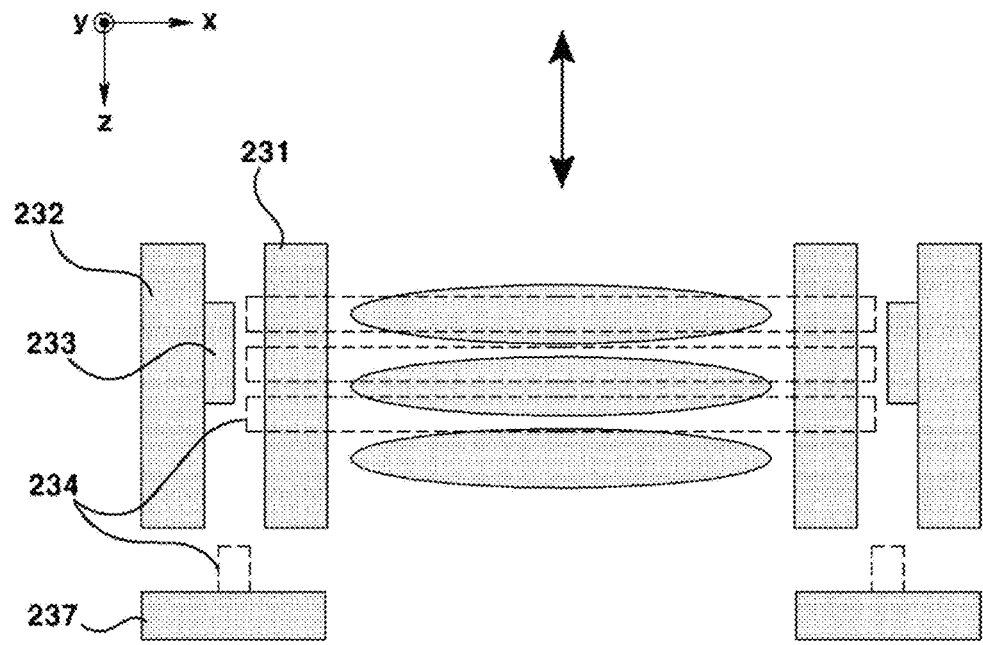
FIG. 7 is a conceptual view illustrating an AF function of a driving camera module.
Figure 8:
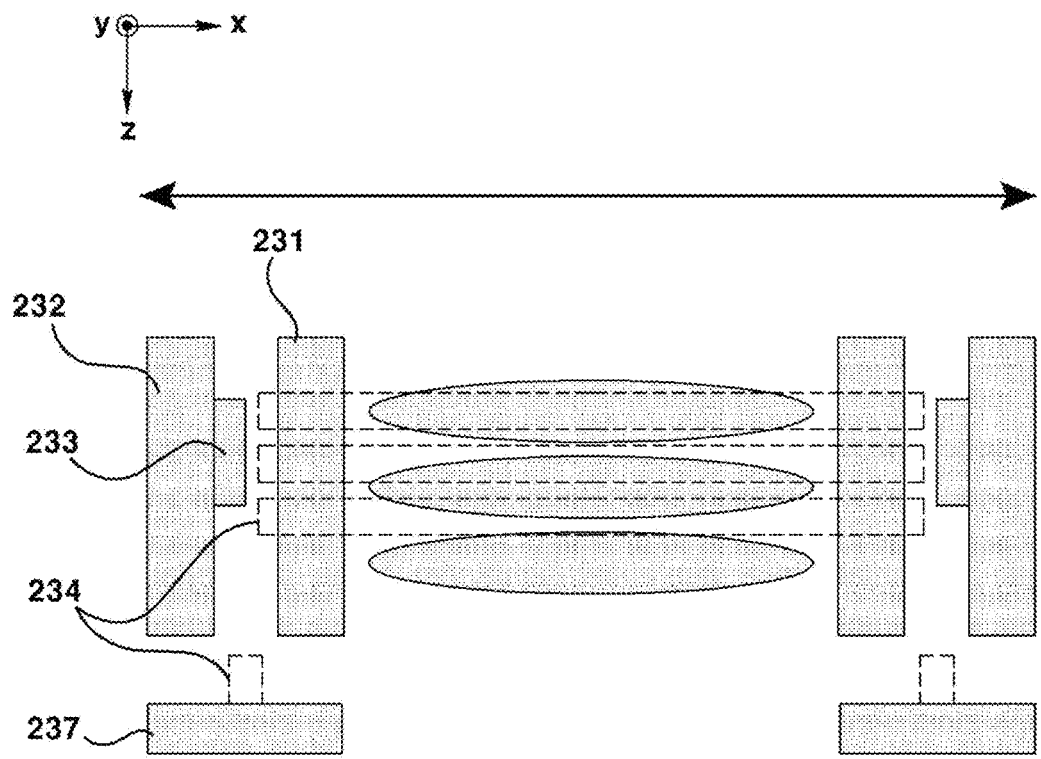
FIG. 8 is a conceptual view illustrating an OIS function of a driving camera module.
Figure 9:
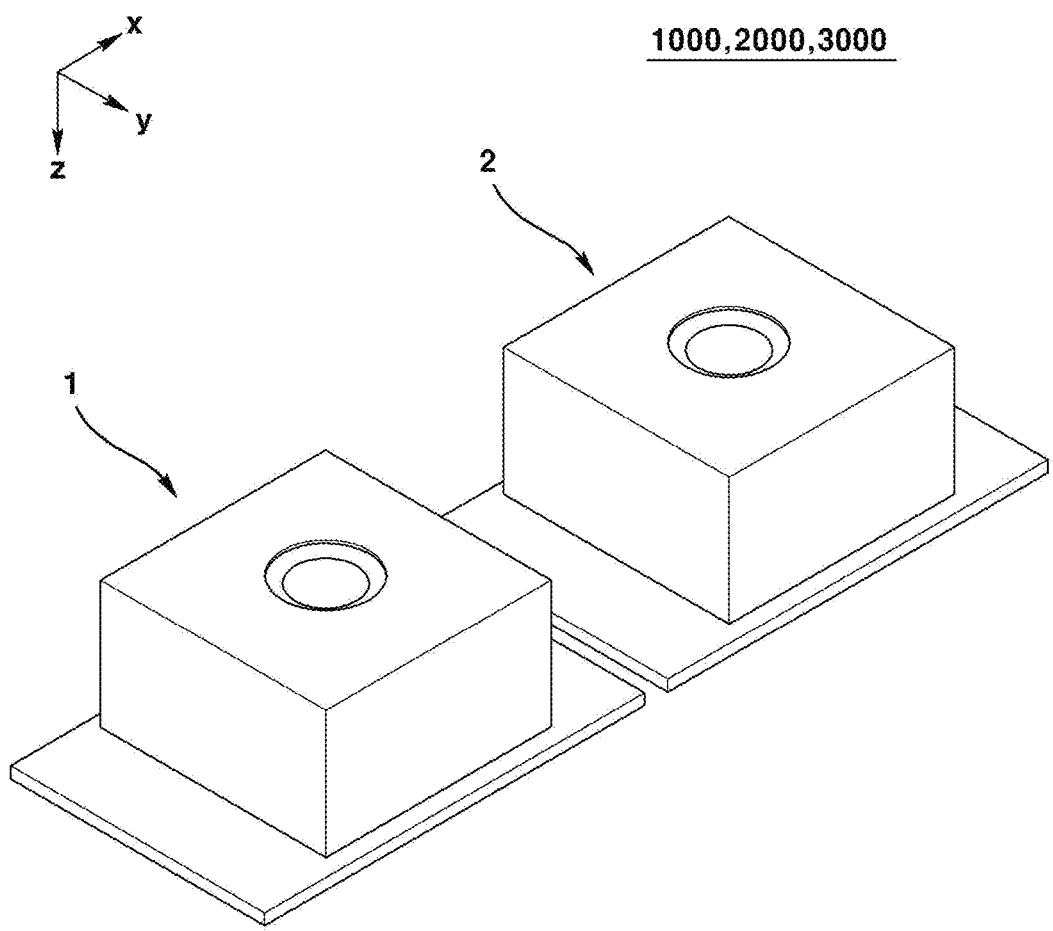
FIG. 9 is a perspective view illustrating a dual camera module according to first, second and third exemplary embodiments of the present invention.

FIG. 5 is a perspective view illustrating a driving camera module, FIG. 6 is an exploded perspective view illustrating a driving camera module, FIG. 7 is a conceptual view illustrating an AF function of a driving camera module, FIG. 8 is a conceptual view illustrating an OIS function of a driving camera module, and FIG. 9 is a perspective view illustrating a dual camera module according to first, second and third exemplary embodiments of the present invention.

Hereinafter, structure of driving camera module (200) will be described.

The driving camera module (200) may comprise a cover member (210), a lens module (220), a lens driving device (230), an image sensor (240) and a substrate (250).

The cover member (210) may be an external member. The cover member (210) may be made of metal material. In this case, the cover member (210) may shield an EMI (Electro Magnetic Interference). That is, the cover member (210) may inhibit an outside electromagnetic wave from entering into an inside. Furthermore, an electromagnetic wave generated from inside of the cover member (210) may be inhibited from being emitted to outside.

However, when the cover member (210) is made of a metal material, activation of housing (232, described later) may be interrupted by being responsive to a magnet (233) of the housing (232). Thus, the cover member (210) may be non-metal material. In this case, the cover member (210) may not perform the function of shielding the EMI (Electro Magnetic Interference).

The cover member (210) may take a hollowed block shape. The cover member (210) may comprise a rear lateral surface (212). The rear lateral surface (212) may be a lateral surface disposed at a rear side of cover member (210). The cover member (210) may comprise a front lateral surface (213). The front lateral surface (213) may be a lateral surface disposed at a front side of cover member (210). However, the shape of cover member (210) is not limited thereto, and a shape configured to cover the lens driving device (230) will be applicable.

An upper surface of cover member (210) may be formed with a transmittance window (211). The transmittance window (211) may be a round opening and may be aligned with an optical axis of lens module (220, described later). As a result, a light having reflected a subject may move to the lens module (220) by passing through the transmittance window (211). A bottom surface of cover member (210) may be opened to form an opening. An inside of the cover member (210) may be disposed with a lens driving device (230). The inside of the cover member (210) may accommodate the lens driving device (230). The cover member (210) may be supported by a substrate (250, described later). The cover member (210) may be fixed by being coupled with the substrate (250). In this case, the substrate (250) may close an opening at a bottom surface of cover member (210).

The lens module (220) may mean a concept comprising at least one lens. The lens module (220) may be accommodated into the lens driving device (230). The lens module (200) may be coupled with a bobbin (231). In this case, a coupling method such as bonding or screw-coupling method may be used. The lens module (220) may be activated by the lens driving device (230). In this case, the lens module (220) may move to an optical axis direction, move to a direction perpendicular to an optical axis direction or may tilt.

The lens driving device (230) may be accommodated into the cover member (210). The lens driving device (230) may be supported by the substrate (250). The lens driving device (230) may accommodate the lens module (220) therein. The lens driving device (230) may activate the lens module in response to an electromagnetic interaction between a magnet (233) and a coil part (234). The lens driving device (230) may comprise a bobbin (231), a housing (232), a magnet (233), a coil part (234), a connection member (235), a support member (236) and a base (237).

The bobbin (231) may be accommodated into the housing (232). The bobbin (231) may be connected with the housing by the connection member (235). In this case, the bobbin (231) may be elastically supported. The bobbin (231) may be accommodated therein by the lens module (220). The bobbin (231) may take a hollowed shape. The bobbin (231) may take a hollowed round shape. A lateral central area of bobbin (231) may be disposed with a winding coil of coil part (234). The bobbin (231) may be disposed at an upper end or a lower end with the connection member (235). In this case, the bobbin (231) may be elastically supported so as to be moved to an optical axis direction.

The housing (232) may be accommodated into an inside of cover member (210). The housing (232) may accommodate the bobbin (231). The housing (232) and bobbin (231) may be connected by the connection member (235). The housing (232) may be connected to the support member (236) to be supported by the base (237). In this case, the housing (232) may be elastically supported. The housing (232) may take a hollowed shape. The housing (232) may take a hollowed block shape formed with a hole to an optical axis direction. The hole of the housing (232) may be disposed with a magnet (233) along an inner surface. In this case, the magnet (233) may be oppositely disposed horizontally with a winding coil of the coil part (234) disposed on the bobbin (231). An upper end or a lower end of housing (232) may be disposed with the connection member (235). A corner portion of housing (232) may be disposed with a wire-shaped support member (236). In this case, the housing (232) may move vertically with an optical axis or elastically supported for being tilted.

The coil part (234) may comprise two coils. The coil part (234) may comprise winding coil disposed at a lateral surface of bobbin (231). The coil part (234) may comprise a pattern coil disposed at the base (237). The winding coil of coil part (234) may be wound along a lateral circumference of bobbin (231). The pattern coil of coil part (234) may be formed at a corner portion at an upper surface of base (237). The pattern coil of coil part (234) may be oppositely disposed vertically with the magnet (233). The coil part (234) may be electrically connected with the substrate (250). The coil part (234) may be electromagnetically interacted with the magnet (233).

The connection member (235) may connect the bobbin (231) with the housing (232). The connection member (235) may be an elastic member. One end of the connection member (235) may be connected to the bobbin (231) and the other end of the connection member (235) may be connected to the housing (232). The connection member (235) may be a leaf spring. In this case, the connection member (235) may exist in the shape of a pair where one of the pair may connect the bobbin to an upper end of housing, and the other one of the pair may connect the bobbin to a lower end of housing (232). The bobbin (231) may be elastically moved by the connection member (235).

The support member (236) may connect the base (237) with the housing (232). In this case, the housing (232) may be supported by the base (237) with a vertical gap therebetween. The support member (236) may be an elastic member. The support member (236) may be a wire. In this case, a lower end of support member (236) may be fixed to a distal end of a corner at the base (237). Furthermore, the support member (236) may be fixed by being disposed along a vertical corner of housing (232) to a lengthwise direction. As a result, the housing (232) can elastically move.

The base (237) may form a bottom surface of lens driving device (230). The base (237) may take a square plate shape. The base (237) may be coupled to a lower end of cover member (210). In this case, the base (237) may cover a lower end opening of cover member (210). However, the base (237) may be formed with a hole aligned with an optical axis. As a result, a light having passed the lens module (220) may be irradiated on an image sensor (240, described later). A distal end of a corner at the base (237) may be fixed by a support member (236). The corner portion of base (237) may be formed with a pattern coil of coil part (234). The base (237) may be supported by being fixed to the substrate (250).

The image sensor (240) may be disposed at an upper surface of substrate (250). The image sensor (240) may be mounted on the substrate (250). The image sensor (240) may be disposed on an optical axis of lens module (220). As a result, the image sensor (240) may obtain a light having passed the lens module (220). The image sensor (240) can convert the irradiated light to an image. It should be apparent that the image may be a broad concept encompassing not only a light signal-converted digital signal but also a result outputted as a light visualized by the digital signal through a display device. The image sensor (240) may be a CCD (Charge Coupled Device), a MOS (Metal Oxide Semi-Conductor), a CPD and a CID. However, the types of image sensor (160) are not limited thereto.

The substrate (250) may be a PCB (Printed Circuit Board). The substrate (250) may be disposed at a lower surface of cover member (210). In this case, the substrate (250) may close an opening at a bottom surface of cover member (210). Furthermore, the substrate (250) may support the cover member (210). An upper surface of substrate (250) may be brought into contact with a bottom surface of base (237). In this case, the substrate (250) may support the base (237). The substrate (250) may be electrically connected to a coil part (234). In this case, the substrate (250) may apply an electric power to the coil part (234). In this case, the substrate (250) can control a direction, wavelength and intensity of a current flowing in the coil part (234). The substrate (250) may be mounted with the image sensor (240). In this case, the substrate (250) may receive an image generated by the image sensor (240).

Hereinafter, operation and effect of driving camera module (200) will be described.

The driving camera module (200) may perform an AF function and an OIS function.

The driving camera module (200) may perform the AF function by activating the lens module (220). The driving camera module (200) may perform the AF function by activating the lens module (220) through the lens driving device (230). The substrate (250) may activate the lens module (220) by applying a power to a winding coil of coil part (234) disposed on the bobbin (231). In this case, the winding coil on the coil part (234) may move the bobbin (231) to an optical axis direction in response to an electromagnetic interaction with the magnet (233). As a result, the lens module (220) accommodated into the bobbin (231) may be integrally moved to an optical axis direction. In this case, the substrate (250) may adjust a moving speed or movement of lens module (220) by controlling the intensity of current flowing on the winding coil of coil part (234). The driving camera module (200) may perform an AF function by moving the lens module (220) to an optical axis direction in response to a distance between the lens module (220) and a subject. The camera module (200) can capture an image high in MTF value by adjusting a focus regardless of a discrete distance from the subject through the AF function.

The driving camera module (200) may perform an OIS function by activating the lens module (220). The driving camera module (200) may perform an OIS function by activating the lens module (220) in response to the lens driving device (230). The substrate (250) can activate the lens module (220) by applying a power to the pattern coil of coil part (234) disposed on the base (237). In this case, the pattern coil of coil part (234) may electromagnetically interact with the magnet (233) disposed at the housing (232) to move the housing (232) to a direction perpendicular to an optical axis or tilt the housing (232). Thus, the lens module (220) accommodated into the bobbin (231) supported by the housing (232) may be integrally moved to a direction perpendicular to an optical axis or tilted. In this case, the substrate (250) can adjust the moving speed or movement of lens module (220) by controlling the intensity of current flowing on the pattern coil of coil part (234). The driving camera module (200) may move or tilt the lens module (220) to a direction perpendicular to an optical axis in response to a shape of lens module (220) to perform the OIS function. Through the OIS function, the driving camera module (200) may correct the shape caused by external force to allowing capturing an image high in MTF value.

When the driving camera module (200) is used as a first camera module (1) of a dual camera module (2000) according to the second exemplary embodiment, a cover member (210) may be called as a "first cover member", a transmittance window (211) as a "first transmittance window", a rear lateral surface (212) as a "first lateral surface", a front lateral surface (213) as a "front lateral surface", a lens module (220) as a "first lens module", a lens driving device (230) as a "first lens driving device", a bobbin (231) to a "first bobbin", a housing (232) as a "first housing", a magnet (233) as a "first magnet", a coil part (234) as a "first coil part", a connection member (235) as a "first connection member", a support member (235) as a "first support member", a base (237) as a "first base", an image sensor (150) as a "first image sensor", and a substrate (160) as a "first substrate".

When the driving camera module (200) is used as a second camera module (2) of a dual camera module (3000) according to the third exemplary embodiment, a cover member (210) may be called as a "second cover member", a transmittance window (211) as a "second transmittance window", a rear lateral surface (212) as a "rear lateral surface", a front lateral surface (213) as a "second lateral surface", a lens module (220) as a "second lens module", a lens driving device (230) as a "second lens driving device", a bobbin (231) as a "second bobbin", a housing (232) as a "second housing", a magnet (233) as a "second magnet", a coil part (234) as a "second coil part", a connection member (235) as a "second connection member", a support member (236) as a "second support member", a base (237) as a "second base", an image sensor (150) as a "second image sensor", and a substrate (160) may be called as a "second substrate".

Hereinafter, the dual camera module (1000) according to the first exemplary embodiment will be described with reference to the accompanying drawings.

Figure 10:
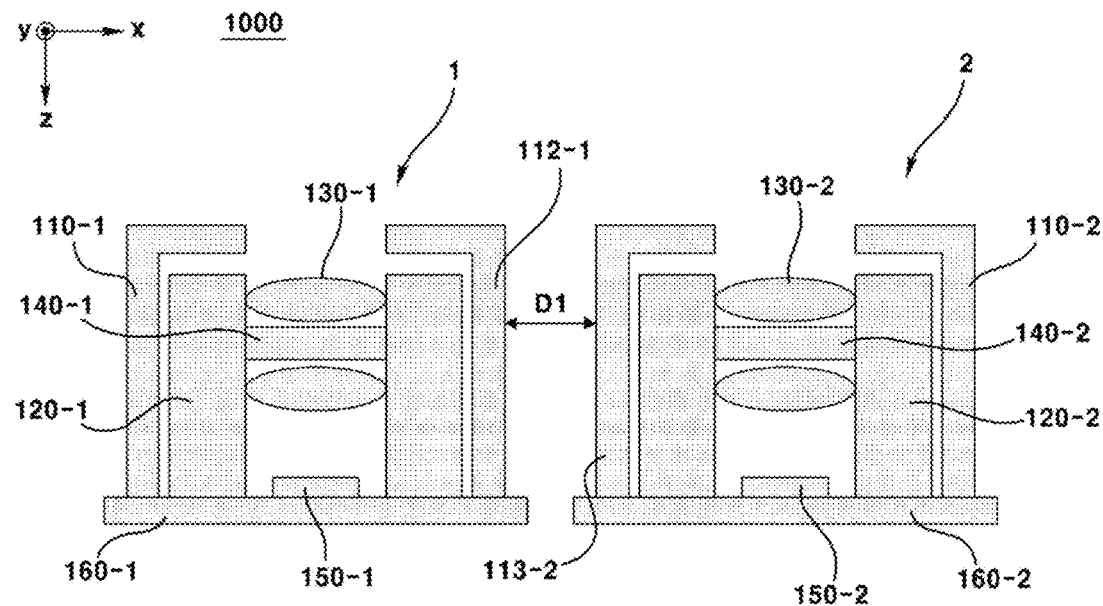
FIG. 10 is a conceptual view illustrating a dual camera module according to a first exemplary embodiment of the present invention.
Figure 11:
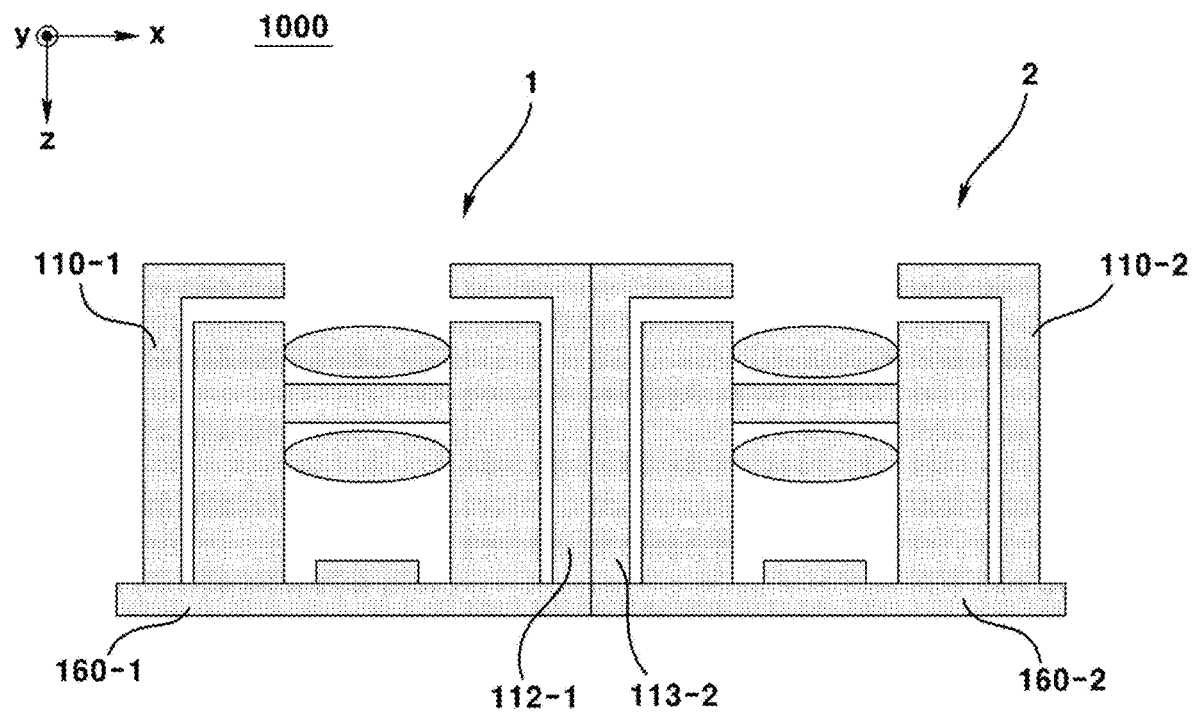
FIG. 11 is a conceptual view illustrating a dual camera module according to a first modification of a first exemplary embodiment of the present invention.
Figure 12:
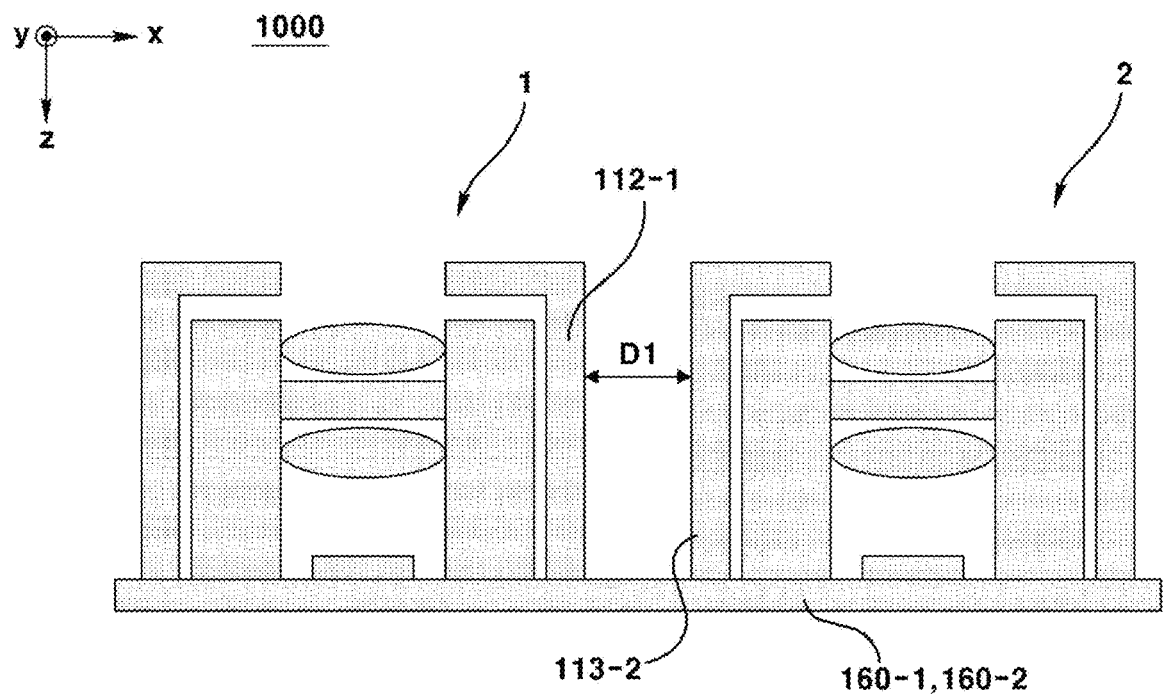
FIG. 12 is a conceptual view illustrating a dual camera module according to a second modification of a first exemplary embodiment of the present invention.
Figure 13:
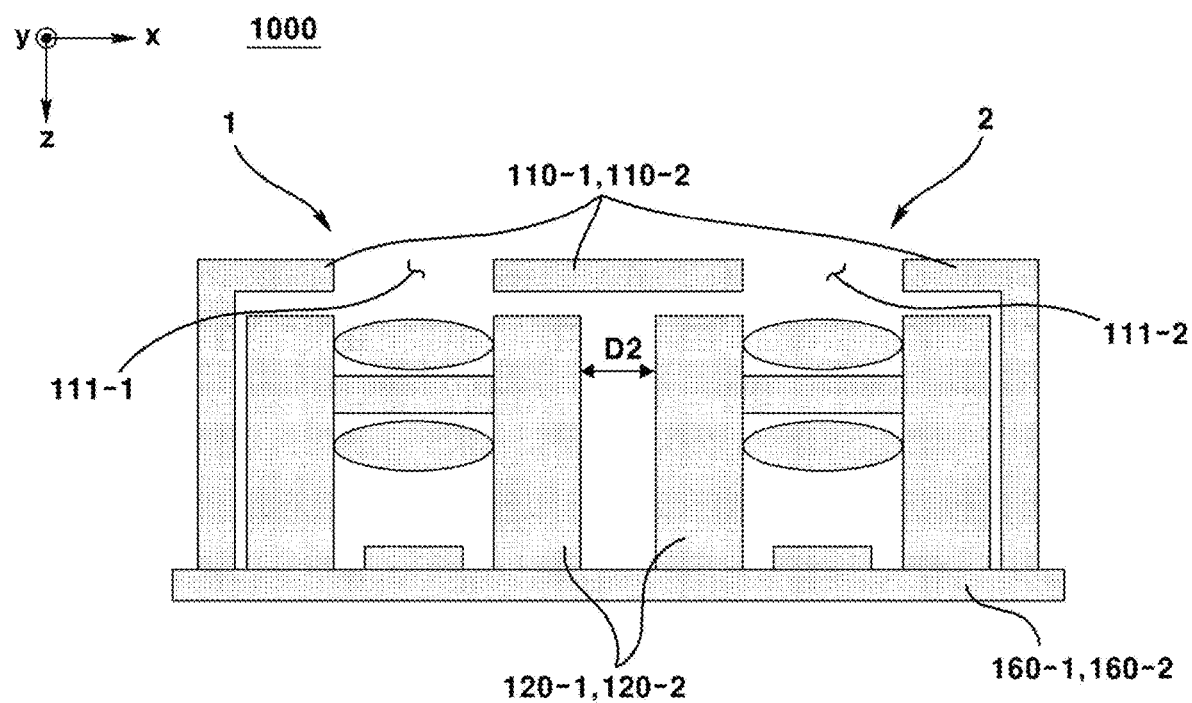
FIG. 13 is a conceptual view illustrating a dual camera module according to a third modification of a first exemplary embodiment of the present invention.
Figure 14:
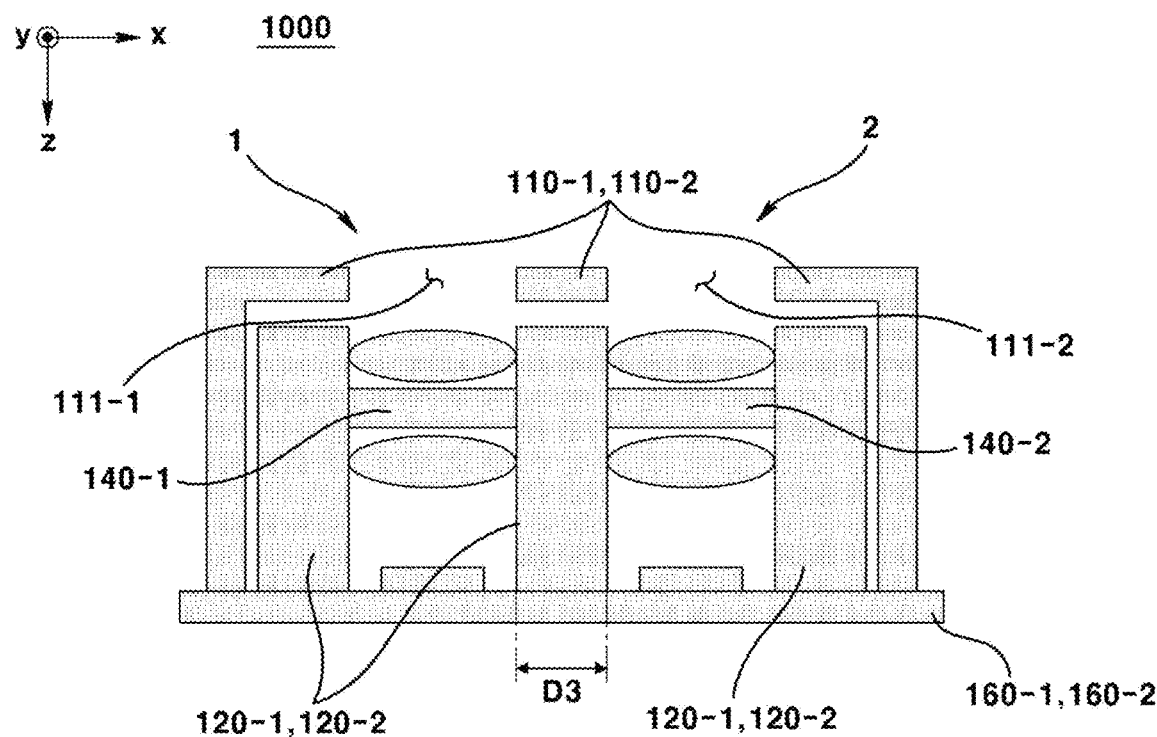
FIG. 14 is a conceptual view illustrating a dual camera module according to a fourth modification of a first exemplary embodiment of the present invention.
Figure 15:
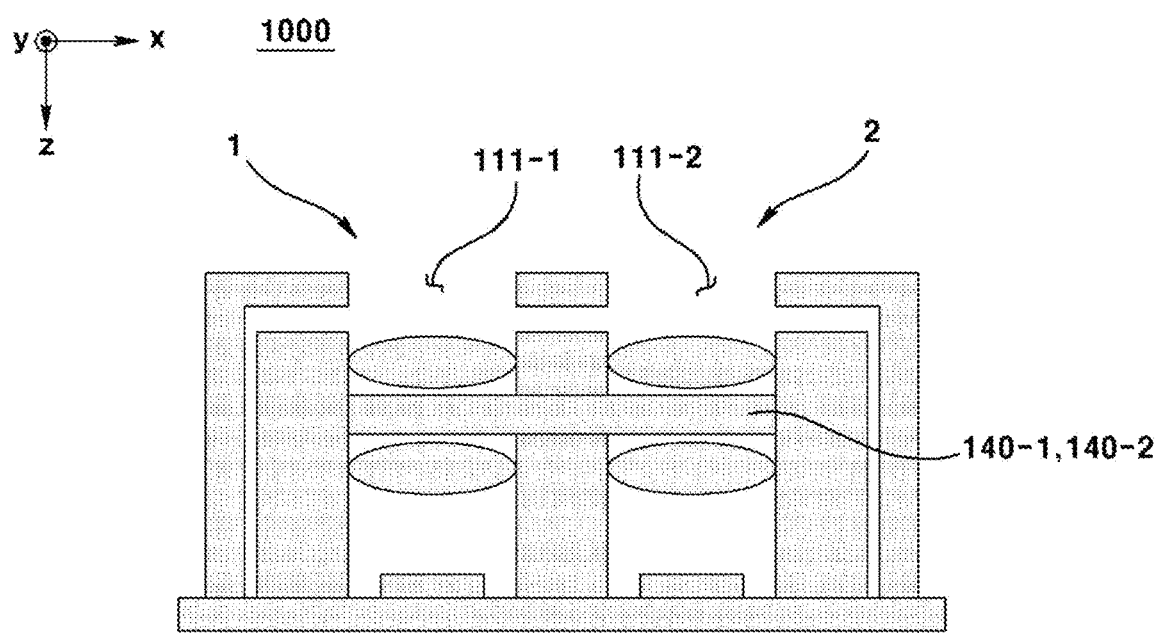
FIG. 15 is a conceptual view illustrating a dual camera module according to a fifth modification of a first exemplary embodiment of the present invention.
Figure 16:
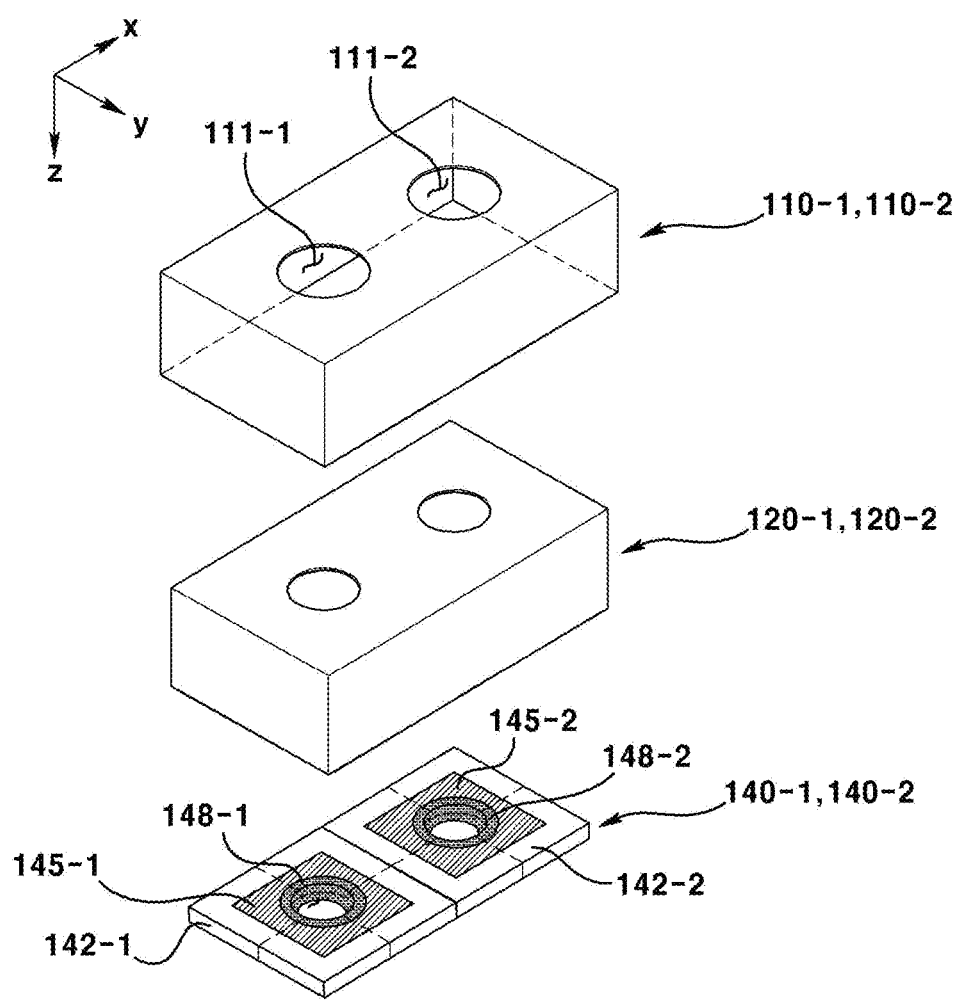
FIG. 16 is a conceptual view illustrating a cover member, lens holder and a liquid lens according to a fifth modification of a first exemplary embodiment of the present invention.

FIG. 9 is a perspective view illustrating a dual camera module according to first, second and third exemplary embodiments of the present invention, FIG. 10 is a conceptual view illustrating a dual camera module according to a first exemplary embodiment of the present invention, FIG. 11 is a conceptual view illustrating a dual camera module according to a first modification of a first exemplary embodiment of the present invention, FIG. 12 is a conceptual view illustrating a dual camera module according to a second modification of a first exemplary embodiment of the present invention, FIG. 13 is a conceptual view illustrating a dual camera module according to a third modification of a first exemplary embodiment of the present invention, FIG. 14 is a conceptual view illustrating a dual camera module according to a fourth modification of a first exemplary embodiment of the present invention, FIG. 15 is a conceptual view illustrating a dual camera module according to a fifth modification of a first exemplary embodiment of the present invention, and FIG. 16 is an exploded perspective view illustrating a cover member, a lens holder and a liquid lens according to a fifth modification of a first exemplary embodiment of the present invention.

Hereinafter, structure of a dual camera module (1000) according to the first exemplary embodiment will be described.

The dual camera module (1000) may comprise a first camera module (1), a second camera module (2) and a controller (not shown). A liquid lens camera module (100) may be used for the first and second camera modules (1, 2). The first camera module (1) and the second camera module (2) may be adjacently disposed. The first camera module (1) and the second camera module (2) may be spaced apart to a front side and a rear side. In this case, the first camera module (1) may be disposed at a front side and the second camera module (2) may be disposed at a rear side. The first camera module (1) and the second camera module (2) may face each other. The first camera module (1) may be a tele-angle camera module. The second camera module (2) may be a wide-angle camera module. That is, a viewing angle of first camera module (1) may be smaller than that of the second camera module (2). Furthermore, at least a portion of viewing angle of first camera module (1) may be comprised within a viewing angle of second camera module (2). Moreover, a viewing angle of first camera module (1) may be all comprised within a viewing angle of second camera module (2). The first camera module (1) may capture a first image (I1). The second camera module (2) may capture a second image (I2). At least a portion of an area of the first image (I1) may be comprised within an area of the second image (I2). All the areas of first image (I1) may be comprised in an area of second image (I2). That is, there may be an overlapping area (O) where an area of first image (I1) and an area of second image (I2) are overlapped. A viewing angle (tele) of first camera module (10) is smaller than a viewing angle (wide) of second camera module (2) in the overlapping area (O) of same subject area, such that the first image (I1) may comprise more pixels relative to the same subject area to thereby allow having a higher resolution, a resolving power or MTF to the same subject area. The first image (I1) and the second image (I2) may be combined. The composite image (C) may have a higher resolution, resolving power or higher MTF than the second image due to the first image (I1). That is, a higher quality of composite image (C) may be generated over a case when an image is captured with a single camera module.

The controller may be electrically connected to a first substrate (160-1) of first camera module (1). At the same time, the controller may be electrically connected to a second substrate (160-2) of second camera module (2). The controller may be mounted on the first substrate (160-1) or on the second substrate (160-2). As a result, the controller can receive a first image (I1) from a first image sensor (150-1) of first camera module (1). At the same time, the controller may receive a second image (I2) from a second image sensor (150-2) of the second camera module (2). The controller may combine the first image (I1) and the second image (I2). In this case, an image stitching algorithm may be used.

The first camera module (1) may be inferably applied with a technical idea of liquid lens camera module (100). The second camera module (2) may be inferably applied with a technical idea of liquid lens camera module (100).

The first camera module (1) may be such that a first lens holder (120-1) is accommodated into the first cover member (110-1) which is an external material. Furthermore, the lens module (130-1) and the liquid lens (140-1) may be accommodated into the first lens holder (120-1). In the present exemplary embodiment, although the first liquid lens (140-1) takes an add-in shape between lenses of first lens module (130-1), the first liquid lens (140-1) may take an exemplary shape of being added on at an upper surface of lenses of first lens module (130-1). In this case, the first liquid lens (140-1) may be disposed at an upper surface of first lens holder (120-1). Furthermore, the first cover member (110-1) may take a hollow shape, and may be formed at an upper surface with a first transmittance window (111-1). Moreover, the first lens holder (120-1) may be formed with the first lens hole (121-1) in which the lens module (130-1) and the liquid lens (140-1) may be installed. The first transmittance window (111-1) and the first lens hole (121-1) may be aligned to an optical axis direction. In addition, the first cover member (110-1) and the first lens holder (120-1) may be disposed at a lower surface with the first substrate (160-1) to thereby cover a bottom surface opening of the first cover member (110-1) and the first lens hole. Furthermore, the first image sensor (150-1) may be mounted by being aligned on the first substrate (160-1) with an optical axis. As a result, the first camera module (1) may be such that an outside light passes the first transmittance window (111-1) to pass the first lens module (130-1) and the first liquid lens (140-1) and to be irradiated on the first image sensor (150-1). The construction of second camera module (2) may be inferably applicable from that of the first camera module (1). The second camera module (20) and the first camera module (1) may be matched in terms of construction.

The first camera module (1) and the second camera module (2) may be proximately disposed to a front side and a rear side. In this case, a first lateral surface (112-1) of first cover member (110-1) and a second lateral surface (113-2) of second cover member (110-2) may mutually face each other. Each of the first lateral surface (112-1) and the second lateral surface (113-2) may be a surface having a shortest distance between the first camera module (1) and the second camera module (2). Furthermore, the first lateral surface (112-1) and the second lateral surface (113-2) may be mutually parallel. A shortest distance (D1) between the first camera module (1) and the second camera module (2) may be smaller than a width of at least one image sensor of the first image sensor (150-1) of first camera module (1) and a second image sensor (150-2) of second camera module (2). A shortest distance (D1) between the first camera module (1) and the second camera module (2) may be smaller than a smaller width of a first direction width of the first image sensor (150-1) and a first direction of second camera module (2) when a direction of the camera module (1) and the second camera module (2) being disposed is called as first direction. Furthermore, a shortest distance (D1) between the first camera module (1) and the second camera module (2)

may be may be smaller than the smallest width of widths of the first image sensor (150-1) and the second image sensor (150-2). A shortest distance (D1) between the first camera module (1) and the second camera module (2) may be less than 2 mm. A shortest distance between the first lateral surface (112-1) and the second lateral surface (113-2) may be less than 2 mm. That is, an actuator of first camera module (1) and the second camera module (2) according to the first exemplary embodiment is a liquid lens (140), such that, when compared with a case where a VCM (Voice Coil Motor) is used as an actuator, no electromagnetic interference is generated between single camera modules. That is, the liquid lens camera module (100) has a smaller emission of electromagnetic wave. Furthermore, the liquid lens camera module (100) may be less influenced by outside electromagnetic wave. Therefore, the first camera module (1) and the second camera module (2) may be extremely closely disposed therebetween in the dual camera module (1000) according to the first exemplary embodiment.

Hereinafter, structure of dual camera module (1000) according to a first modification of the first exemplary embodiment will be described.

The dual camera module (1000) according to the first modification may be such that the cover member (110-1) and the second cover member (110-2) are brought into contact. In this case, the cover member (110-1) and the second cover member (110-2) may be bond-coupled by an adhesive material. The first lateral surface (112-1) of first cover member (110-1) and the second lateral surface (113-2) of second cover member (110-2) may be brought into contact. As a result, a gap may disappear between the first camera module (1) and the second camera module (2). Furthermore, the shape and arrangement of first sub substrate (160-1) and the second substrate (160-2) may be adjusted in order to accomplish a compactly adhered structure between the first camera module (1) and the second camera module (2). In this case, a rear end of the first substrate (160-1) and a front end of the second substrate (160-2) may be mutually contacted. Moreover, the first substrate (160-1) and the second substrate (160-2) may be integrally formed. When the first substrate (160-1) and the second substrate (160-2) are integrally formed, the first image sensor (150-1) and the second image sensor (150-2) may be mutually bonded or integrally formed to be disposed on a substrate where the first substrate (160-1) and the second substrate (160-2) are integrally formed. When the first image sensor (150-1) and the second image sensor (150-2) are integrally formed, a width of image sensor may be a width of an active area on the image sensor.

Hereinafter, structure of dual camera module (1000) according to a second modification of first exemplary embodiment will be described.

The first substrate (160-1) and the second substrate (160-2) may be integrally formed in the dual camera module (1000) according to the second modification. In this case, a front end of the first substrate (160-1) and a rear end of the second substrate (160-2) may be connected. That is, the front end of the first substrate (160-1) and the rear end of the second substrate (160-2) may be soldered by a connector. Furthermore, the first substrate (160-1) and a rear end of the second substrate (160-2) may be manufactured with a single element. In this case, the integrally formed first substrate (160-1) and the second substrate (160-2) may take a rectangular plate shape having a length to a front side and a rear side.

Hereinafter, structure of dual camera module (1000) according to a third modification of the first exemplary embodiment will be described.

The first cover member (110-1) and the second cover member (110-2) may be integrally formed in the dual camera module (1000) according to the third modification. In this case, the first cover member (110-1) and the second cover member (110-2) may share an inner space. The first lateral surface (112-1) and the second lateral surface (113-2) may be omitted, and an upper surface of first cover member (110-1) and an upper surface of second cover member (110-2) may be connected to integrally form a cover member. An upper surface of integrally formed first and second cover members (110-1,110-2) may be aligned with an optical axis of the first camera module (1) to form a first transmittance window (111-1). Furthermore, a second transmittance window (111-2) may be formed by allowing spaced apart from the first transmittance window (111-1) to a rear side to be aligned with an optical axis of second camera module (2). Furthermore, a bottom surface of the integrally formed first and second cover members (110-1,110-2) may be disposed with the first substrate (160-1) and the second substrate (160-2). In this case, the first substrate (160-1) and the second substrate (160-2) may be integrally formed as in the second modification. An inside of the integrally formed first and second cover members (110-1,110-2) may be accommodated by first and second lens holders (120-1,120-2), first and second lens modules (130-1,130-2), first and second liquid lenses (140-1,140-2) and first and second image sensors (150-1,150-2). To this end, the integrally formed first and second cover members (110-1,110-2) may take a hollowed shape having a length to a front side and a rear side. The integrally formed first and second cover members (110-1,110-2) may take a hollowed block shape having a length to a front side and to a rear side. In this case, a shortest distance (D2) between the first lens holder (120-1) and the second lens holder (120-2) may be less than 2 mm. A rear lateral surface of first lens holder (120-1) and a front lateral surface of second lens holder (120-2) may be so disposed as to face each other. In this case, a shortest distance between the rear lateral surface of first lens holder (120-1) and the front lateral surface of second lens holder (120-2) may be less than 2 mm. A shortest distance between the rear lateral surface of first lens holder (120-1) and the front lateral surface of second lens holder (120-2) may be smaller than a width of at least one image sensor of the first image sensor of the first camera and the second image sensor of second camera. A shortest distance between the rear lateral surface of first lens holder (120-1) and the front lateral surface of second lens holder (120-2) may be smaller than a smaller width in a width of first direction of the first image sensor (150-1) and a width of first direction of second camera module (2), when a direction where the first camera module (1) and the second camera module (2) are disposed is defined as a first direction.

Furthermore, a shortest distance between the rear lateral surface of first lens holder (120-1) and the front lateral surface of second lens holder (120-2) may be smaller than the smallest width in the widths of the first image sensor (150-1) and the second image sensor (150-2).

Hereinafter, the dual camera module (1000) according to a fourth modification of the first exemplary embodiment will be described.

The dual camera module (1000) according to the fourth modification may be a structure where the first and second lens holders (120-1,120-2) are integrally formed in the third modification. The dual camera module (1000) according to the fourth modification may be a structure where the rear end of first lens holder (120-1) and the front end of second lens holder (120-2) are brought into contact to form an integral shape. As a result, the integrally formed first and second lens holders (120-1,120-2) may take a 3D structure having a length to front and rear directions. Furthermore, the integrally formed first and second lens holders (120-1,120-2) may take a cubic structure having a length to front and rear directions. Moreover, the integrally formed first and second lens holders (120-1,120-2) may be formed with a first lens hole (121-1) by being aligned with an optical axis of the first camera module (1). A second lens hole (121-2) may be formed by being spaced apart from the first lens hole (121-1) to a rear side and by being aligned with an optical axis of the second camera module (2). In this case, a shortest distance (D3) between the first liquid lens (140-1) and the second liquid lens (140-2) may be less than 2 mm.

A rear lateral surface of first liquid lens (140-1) and a front lateral surface of second liquid lens (140-2) may be so disposed as to face each other. In this case, a shortest distance between the rear lateral surface of first liquid lens (140-1) and a front lateral surface of second liquid lens (140-2) may be less than 2 mm. A shortest distance between the rear lateral surface of first liquid lens (140-1) and a front lateral surface of second liquid lens (140-2) may be smaller than a width of at least one image sensor of the first image sensor (150-1) of the first camera module (1) and the second image sensor (150-2) of second camera module (2). A shortest distance between the rear lateral surface of first liquid lens (140-1) and the front lateral surface of second liquid lens (140-2) may be smaller than a smaller width in a width of first direction of the first image sensor (150-1) and a width of first direction of second image sensor (150-2), when a direction where the first camera module (1) and the second camera module (2) are disposed is defined as a first direction. A shortest distance between the rear lateral surface of first liquid lens (140-1) and the front lateral surface of second liquid lens (140-2) may be smaller than the smallest width in the widths of the first image sensor (150-1) and the second image sensor (150-2).

Hereinafter, the dual camera module (1000) according to a fifth modification of the first exemplary embodiment will be described.

The dual camera module (1000) according to the fifth modification may be a structure where the first and second lens holders (120-1,120-2) are integrally formed with the first and second liquid lenses (140-1, 140-2) in the third modification. The first and second lens holders (120-1,120-2) may be integrally formed as in the fourth modification. However, a portion of the first lens holder (121-1) and a portion of the second lens holder (121-2) may be connected to communicate therebetween. That is, an inner space may be partially shared by the first and second lens holders (120-1,120-2). Therefore, the integrally formed first and second liquid lenses (140-1,140-2) may be inserted in an add-in shape at an area where the first lens hole (121-1) and the second lens hole (121-2) are communicated at the first and second lens holders (120-1, 120-2). Although FIG. 15 has illustrated only the add-in shape, the integrally formed first and second liquid lenses (140-1, 140-2) may be disposed at an upper surface of the integrally-formed first and second lens holders (120-1, 120-2) in an add-on shape. The first liquid lens (140-1) and the second liquid lens (140-2) may be integrally formed. As illustrated in FIG. 16, A rear lateral surface of first liquid lens (140-1) and a front lateral surface of second liquid lens (140-2) may be mutually coupled to allow the first and second liquid lenses (140-1, 140-2) to be integrally formed. A rear end of the first cover member (141-1) and a front end of the second upper cover member (141-2) may be mutually coupled to be integrally formed, a rear lateral surface of first core plate (142-1) and a front lateral surface of second core plate (142-2) are coupled to be integrally formed, and a rear end of first lower cover (149-1) and a front end of second lower cover (149-2) may be coupled to be integrally formed. As a result, the integrally formed first and second liquid lenses (140-1,140-2) may take a cubic shape having a length to front and rear directions. In this case, a first cavity (143-1) may be disposed by allowing the first core plate (142-1) to be aligned with an optical axis of the first camera module (1). Furthermore, a second cavity (143-2) may be disposed by allowing the second core plate (142-2) to be aligned with an optical axis of the second camera module (2) and allowing the first cavity (143-1) to be spaced apart to a rear side. Furthermore, a first electrode (145-1) may form a gap with a third electrode (145-2) at an area where the integrally formed first and second liquid lenses (140-1,140-2) are contacted. Moreover, a second electrode (146-1) and a fourth electrode (146-2) may form a gap. As a result, no electric short-circuit is generated.

The modifications of the first exemplary embodiment can provide a compactly structured dual camera module (1000) by integrating elements of the first and second camera modules (1, 2). Moreover, the compactly structured dual camera module (1000) has a structure where a discrete distance between the first and second camera modules (1, 2) can be further narrowed.

Figure 17:
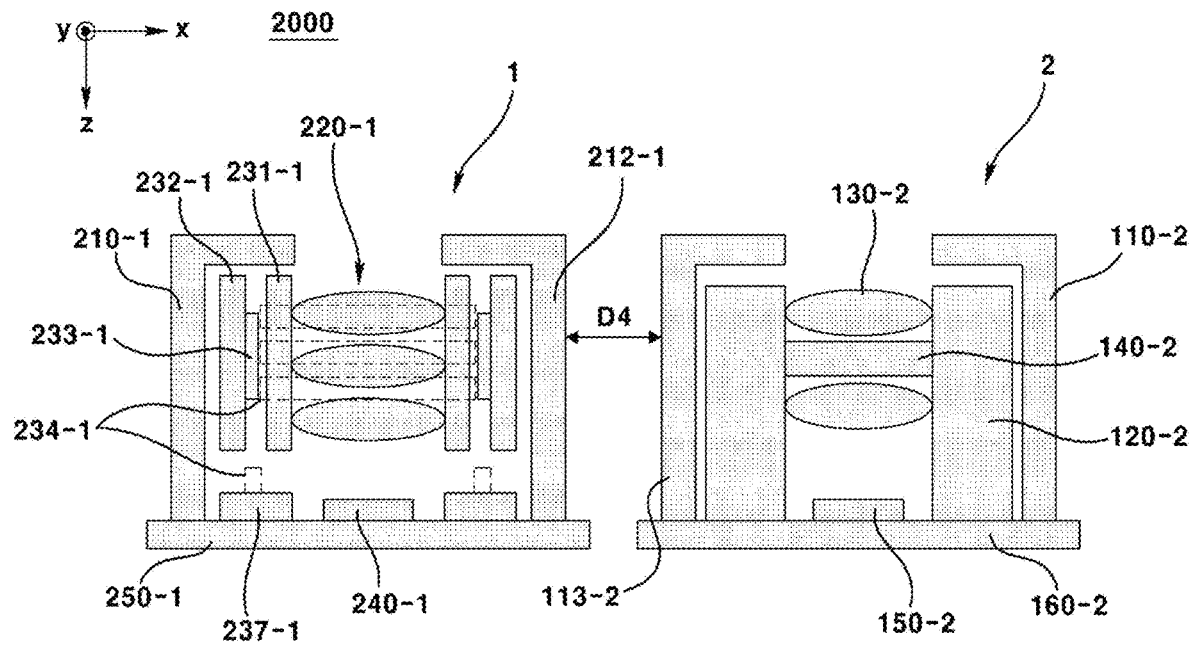
FIG. 17 is a conceptual view illustrating a dual camera module according to a second exemplary embodiment of the present invention.
Figure 18:
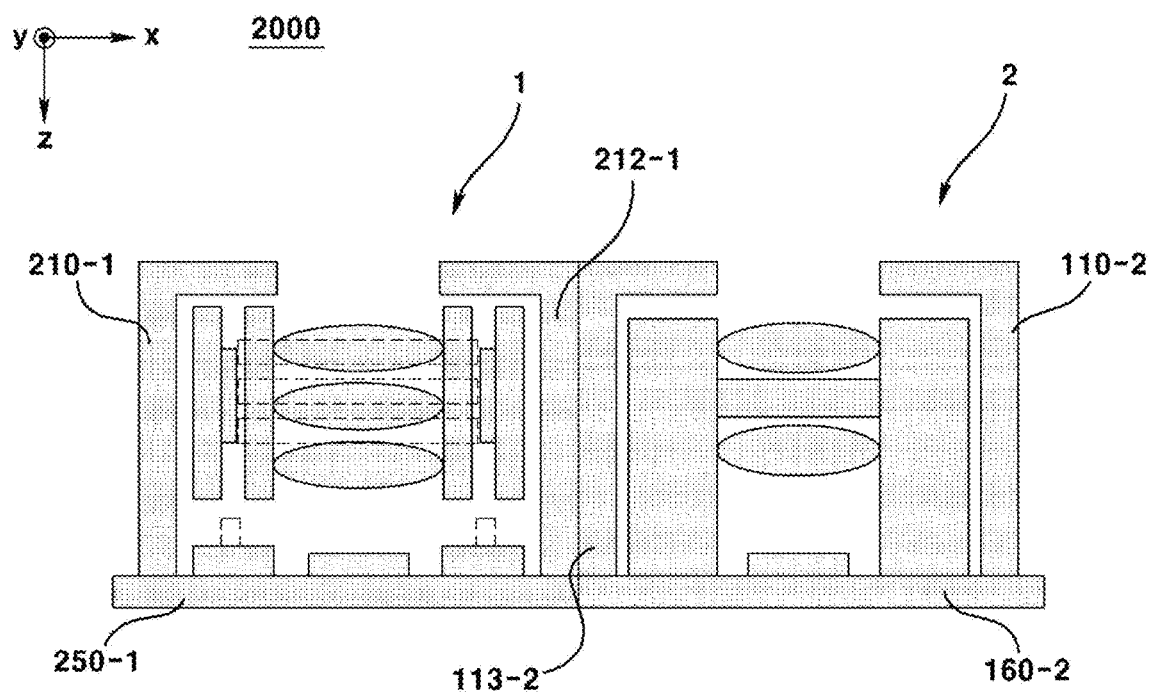
FIG. 18 is a conceptual view illustrating a dual camera module according to a first modification of a second exemplary embodiment of the present invention.
Figure 19:
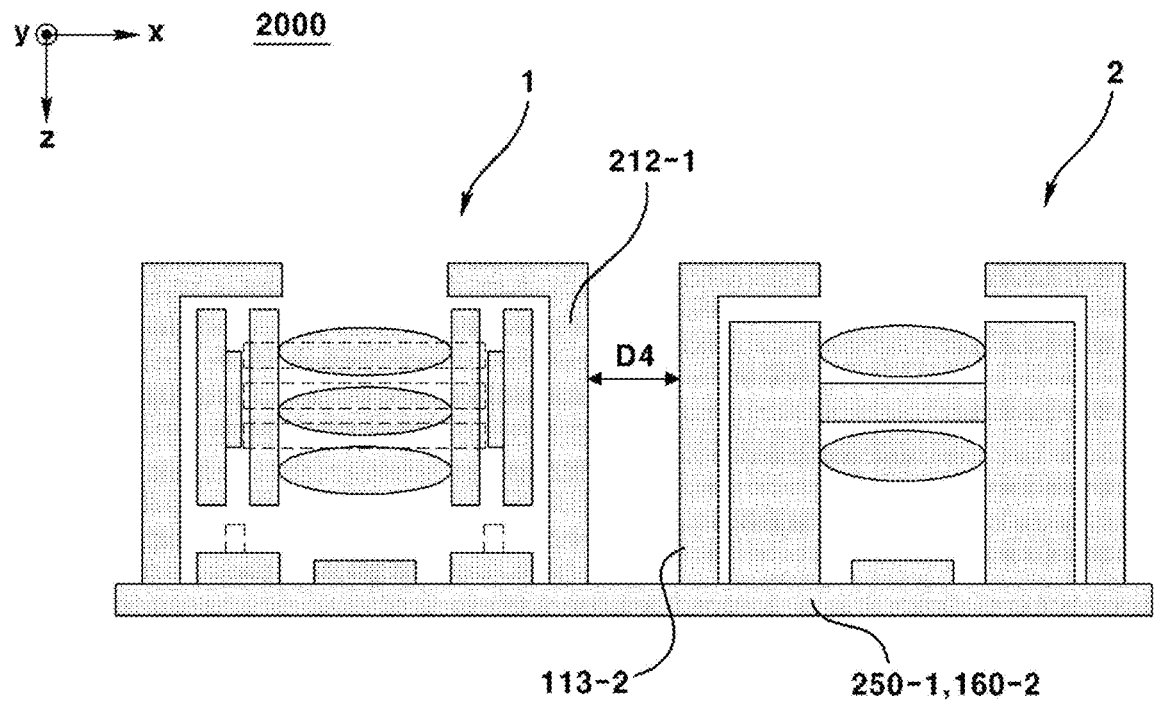
FIG. 19 is a conceptual view illustrating a dual camera module according to a second modification of a second exemplary embodiment of the present invention.
Figure 20:
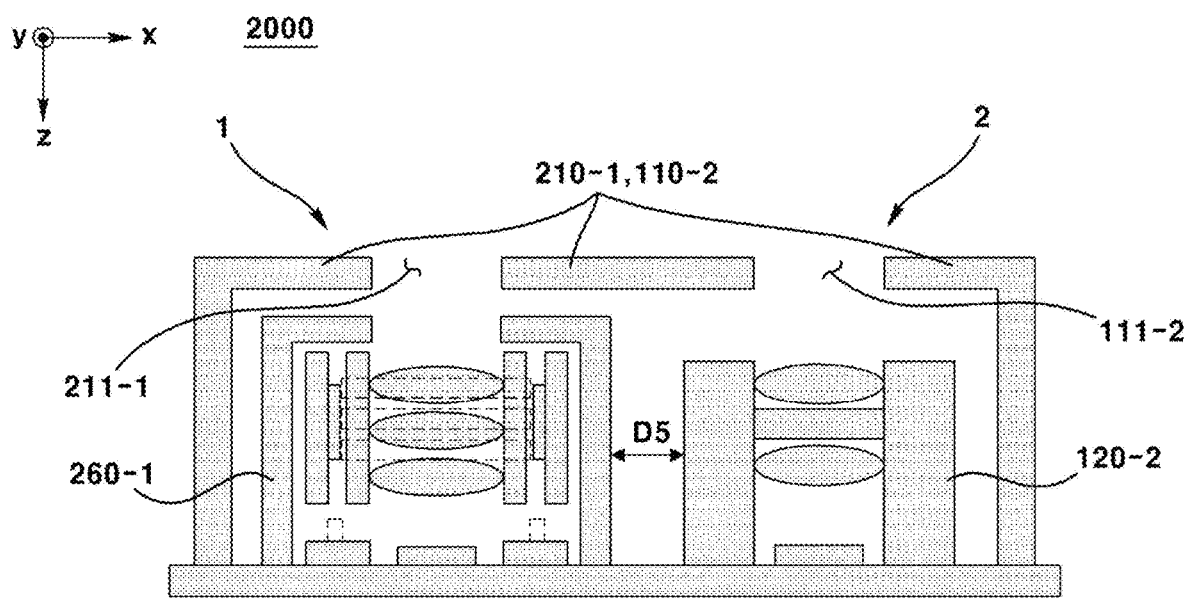
FIG. 20 is a conceptual view illustrating a dual camera module according to a third modification of a second exemplary embodiment of the present invention.

Hereinafter, a dual camera module (2000) according to a second exemplary embodiment will be described with reference to the accompanying drawings. FIG. 9 is a perspective view illustrating a dual camera module according to a second exemplary embodiment, FIG. 17 is a conceptual view illustrating a dual camera module according to a second exemplary embodiment of the present invention, FIG. 18 is a conceptual view illustrating a dual camera module according to a first modification of a second exemplary embodiment of the present invention, FIG. 19 is a conceptual view illustrating a dual camera module according to a second modification of a second exemplary embodiment of the present invention, and FIG. 20 is a conceptual view illustrating a dual camera module according to a third modification of a second exemplary embodiment of the present invention.

Hereinafter, structure of a dual camera module (2000) according to a second exemplary embodiment will be described with reference to the accompanying drawings.

The dual camera module (2000) may comprise a first camera module (1), a second camera module (2) and a controller (not shown). A driving camera module (200) may be used for the first camera modules (1). A liquid lens camera module (100) may be used for the second camera module (2). The first camera module (1) and the second camera module (2) may be adjacently disposed. The first camera module (1) and the second camera module (2) may be spaced apart to a front side and a rear side. In this case, the first camera module (1) may be disposed at a front side and the second camera module (2) may be disposed at a rear side. The first camera module (1) and the second camera module (2) may face each other. The first camera module (1) may be a tele-angle camera module. The second camera module (2) may be a wide-angle camera module. Furthermore, the first camera module (1) may be a wide-angle camera module. The second camera module (2) may be a tele-angle camera module. That is, a viewing angle of first camera module (1) may be smaller or greater than that of the second camera module (2). Furthermore, at least a portion of viewing angle of first camera module (1) may be comprised within a viewing angle of second camera module (2). Moreover, a viewing angle of first camera module (1) may be all comprised within a viewing angle of second camera module (2). At least a portion of viewing angle of second camera module (2) may be comprised within a viewing angle of the first camera module (1). Moreover, a viewing angle of second camera module (2) may be all comprised within a viewing angle of first camera module (1). The first camera module (1) may capture a first image (I1). The second camera module (2) may capture a second image (I2). At least a portion of an area of the first image (I1) may be comprised within an area of the second image (I2). At least a portion of an area of the second image (I2) may be comprised within an area of the first image (I1). All the areas of first image (I1) may be comprised in an area of second image (I2). All the areas of second image (I2) may be comprised in an area of first image (I1). That is, there may exist an overlapping area (O) where an area of first image (I1) and an area of second image (I2) are overlapped. A viewing angle (tele) of first camera module (1) is smaller than a viewing angle (wide) of second camera module (2) in the overlapping area (O), such that resolution and MTF may be higher comprising more pixels for the first image (I1). The first image (I1) and the second image (I2) may be combined. The composite image (C) may have a higher resolution and higher MTF than the second image (I2) because of the first image (I1). That is, a higher quality of composite image (C) may be generated over a case when an image is captured with a single camera module.

The viewing angle (tele) of second camera module (2) is smaller than the viewing angle (wide) of first camera module (1) such that the second camera module (2) may have a higher resolution comprising the second image (I2) with a higher pixel. The first image (I1) and the second image (I2) may be combined. The composite image (C) may have a higher resolution and higher MTF than the first image (I1) because of the second image (I2). That is, a higher quality of composite image (C) may be generated over a case when an image is captured with a single camera module.

The controller may be electrically connected to a first substrate (250-1) of first camera module (1). At the same time, the controller may be electrically connected to a second substrate (160-2) of second camera module (2). The controller may be mounted on the first substrate (250-1) or on the second substrate (160-2). As a result, the controller can receive a first image (I1) from a first image sensor (240-1) of first camera module (1). At the same time, the controller may receive a second image (I2) from a second image sensor (150-2) of the second camera module (2). The controller may combine the first image (I1) and the second image (I2). In this case, an image stitching algorithm may be used.

The dual camera module (2000) according to the second exemplary embodiment may be inferably applied with the dual camera module (1000) of the first exemplary embodiment. However, the dual camera module (2000) according to the second exemplary embodiment may be different from the dual camera module (1000) of the first exemplary embodiment in that a driving lens camera module (200) is used in the dual camera module (2000) according to the second exemplary embodiment.

Hereinafter, the same technical idea as that of the first exemplary embodiment will be omitted.

The first camera module (1) may be inferably applied with the technical idea of the driving camera module (100). The second camera module (2) may be inferably applied with the technical idea of the lens camera module (100). The second camera module (2) may be inferably applied with the technical idea of the second camera module according to the first exemplary embodiment.

The first camera module (1) may be a driving camera module (200). An interior of first cover member (210-1) which is an external material may be disposed with a first lens driving device (230-1). The first lens driving device (230-1) may comprise a first housing (232-1), a first bobbin (231-1) accommodated into the first housing (232-1) and a first lens module (220-1) accommodated into the first bobbin (231-1). Furthermore, the first housing (232-1) and the first bobbin (231-1) may be connected by a first connection member. Moreover, the first housing (232-1) may be connected to a first base (237) by a first support member. In addition, a first image sensor (240-1) may be mounted on a first substrate (250-1) by being aligned with an optical axis. Furthermore, an inside of the first housing (232-1) may be disposed with a first magnet (233-1). Moreover, a first coil part (234-1) may comprise a winding coil at an outside of the first bobbin (231-1) that is horizontally and oppositely disposed with the first magnet (233-1). In addition, the first coil part (234-1) may comprise a pattern coil at a corner portion of the first base (237-1) that is vertically and oppositely disposed with the first magnet (233-1).

The first camera module (1) and the second camera module (2) may be proximately disposed to a front side and a rear side. In this case, a first lateral surface (212-1) of first cover member (210-1) and a second lateral surface (113-2) of second cover member (110-2) may mutually face each other. Each of the first lateral surface (212-1) and the second lateral surface (113-2) may be a surface having a shortest distance between the first camera module (1) and the second camera module (2). Furthermore, the first lateral surface (212-1) and the second lateral surface (113-2) may be mutually parallel. A shortest distance (D4) between the first camera module (1) and the second camera module (2) may be less than 2 mm. A shortest distance between the first lateral surface (212-1) and the second lateral surface (113-2) may be less than 2 mm. A shortest distance between the first lateral surface (212-1) and the second lateral surface (113-2) may be smaller than a width of at least one image sensor of the first image sensor (240-1) of first camera module (1) and a second image sensor (150-2) of second camera module (2). That is, an actuator of the second camera module (2) according to the second exemplary embodiment is a second liquid lens (140-2), such that electromagnetic wave that affects the lens driving device (230-1) of first camera module (1) may hardly be generated. Furthermore, the electromagnetic wave generated from the lens driving device (230-1) of first camera module (1) may not affect the second liquid lens (140-2). Therefore, the first camera module (1) and the second camera module (2) may be extremely closely disposed therebetween.

A shortest distance (D1) between the first camera module (1) and the second camera module (2) may be smaller than a smaller width of a first direction width of the first image sensor (150-1) and a first direction of second camera module (2) when a direction of the camera module (1) and the second camera module (2) being disposed is called as first direction. Furthermore, a shortest distance (D1) between the first camera module (1) and the second camera module (2) may be may be smaller than the smallest width of widths of the first image sensor (150-1) and the second image sensor (150-2). A shortest distance (D1) between the first camera module (1) and the second camera module (2) may be less than 2 mm. A shortest distance between the first lateral surface (112-1) and the second lateral surface (113-2) may be less than 2 mm.

That is, an actuator of first camera module (1) and the second camera module (2) according to the first exemplary embodiment is a liquid lens (140), such that, when compared with a case where a VCM (Voice Coil Motor) is used as an actuator, no electromagnetic interference is generated between single camera modules. That is, the liquid lens camera module (100) has a smaller emission of electromagnetic wave. Furthermore, the liquid lens camera module (100) may be less influenced by outside electromagnetic wave. Therefore, the first camera module (1) and the second camera module (2) may be extremely closely disposed therebetween in the dual camera module (1000) according to the first exemplary embodiment.

Hereinafter, structure of dual camera module (2000) according to a first modification of the second exemplary embodiment will be described.

The dual camera module (2000) according to the first modification may be configured such that the first cover member (210-1) and the second cover member (110-2) are brought into contact. In this case, the first cover member (210-1) and the second cover member (110-2) may be bond-coupled by an adhesive material. The first lateral surface (212-1) of first cover member (210-1) and the second lateral surface (113-2) of second cover member (110-2) may be brought into contact. As a result, gap may disappear between the first camera module (1) and the second camera module (2). Furthermore, the shape and arrangement of first substrate (250-1) and the second substrate (160-2) may be adjusted in order to accomplish a compactly adhered structure between the first camera module (1) and the second camera module (2). In this case, a rear end of the first substrate (250-1) and a front end of the second substrate (160-2) may be mutually contacted. Moreover, the first substrate (250-1) and the second substrate (160-2) may be integrally formed.

Hereinafter, structure of dual camera module (2000) according to a second modification of the first exemplary embodiment will be described.

The dual camera module (2000) according to the second modification may be configured such that a first substrate (250-1) and the second substrate (160-2) are integrally formed. In this case, a front end of the first substrate (250-1) and a rear end of the second substrate (160-2) may be connected. That is, the front end of the first substrate (250-1) and the rear end of the second substrate (160-2) may be soldered by a connector. Furthermore, the first substrate (250-1) and the second substrate (160-2) may be manufactured with a single element. In this case, the integrally formed first substrate (250-1) and second substrate (160-2) may take a rectangular plate shape having a length to a front side and to a rear side.

Hereinafter, structure of dual camera module (2000) according to a third modification of the first exemplary embodiment will be described.

A first cover member (210-1) and the second cover member (110-2) may be integrally formed in the dual camera module (2000) according to the third modification. In this case, the first cover member (210-1) and the second cover member (110-2) may share an inner space. A first lateral surface (212-1) and the second lateral surface (113-2) may disappear, and an upper surface of first cover member (210-1) and an upper surface of second cover member (110-2) may be connected to form an integral cover member. An upper surface of integrally formed first and second cover members (210-1,110-2) may be aligned with an optical axis of the first camera module (1) to form a first transmittance window (211-1). Furthermore, a second transmittance window (111-2) may be formed by allowing being spaced apart from the first transmittance window (211-1) to a rear side to be aligned with an optical axis of second camera module (2). Furthermore, a bottom surface of the integrally formed first and second cover members (210-1,110-2) may be disposed with a first substrate (250-1) and the second substrate (160-2). In this case, the first substrate (250-1) and the second substrate (160-2) may be integrally formed as in the second modification. An inside of the integrally formed first and second cover members (210-1,110-2) may be accommodated by a first lens module (220-1), a first lens driving device (230-1), a first image sensor (240-1), a first substrate (250-1), a second lens holder (120-2), a second lens module (130-2), a second liquid lens (140-2), a second image sensor (150-2) and a second substrate (160-2). Toward this end, the integrally formed first and second cover members (210-1, 110-2) may take a hollowed shape having a length to a front side and a rear side. The integrally formed first and second cover members (210-1,110-2) may take a hollowed block shape having a length to a front side and to a rear side. In this case, in order to protect the first lens driving device (230-1), a first complementary cover member (260-1) may be added. The first complementary cover member (260-1) may take a hollowed shape to accommodate therein the lens driving device (230-1). The first complementary cover member (260-1) may take a hollowed cubic shape. The first complementary cover member (260-1) may be formed with a metal material to shield an outside electromagnetic wave. As a result, the first lens driving device (230-1) may be electrically stable. Furthermore, the first lens driving device (230-1) may be protected from outside physical impact. In this case, a shortest distance (D5) between the first complementary cover member (260-1) and the second lens holder (120-2) may be less than 2 mm. A rear lateral surface of first complementary cover member (260-1) and a front lateral surface of second lens holder (120-2) may be so disposed as to face each other.

In this case, a shortest distance between the rear lateral surface of first complementary cover member (260-1) and the front lateral surface of second lens holder (120-2) may be less than 2 mm. A shortest distance (D5) between the first complementary cover member (260-1) and the second lens holder (120-2) may be smaller than a width of at least one image sensor of the first image sensor (240-1) of the first camera module (1) and the second image sensor (150-2) of second camera module (2). A shortest distance (D5) between the first complementary cover member (260-1) and the second lens holder (120-2) may be smaller than a smaller width in a width of first direction of the first image sensor (240-1) and a width of first direction of second camera module (2), when a direction where the first camera module (1) and the second camera module (2) are disposed is defined as a first direction. A shortest distance (D5) between the first complementary cover member (260-1) and the second lens holder (120-2) may be smaller than the smallest width of the width of the first image sensor (240-1) and the width of the second image sensor (150-2).

The modifications according to the second exemplary embodiment may provide a dual camera module (2000) having a compact structure by integrating the elements of the first camera module (1) and the second camera module (2). Furthermore, a discrete distance between the first camera module (1) and the second camera module (2) can be further narrowed.

Hereinafter, a dual camera module (3000) according to a third exemplary embodiment will be described with reference to the accompanying drawings.

Figure 21:
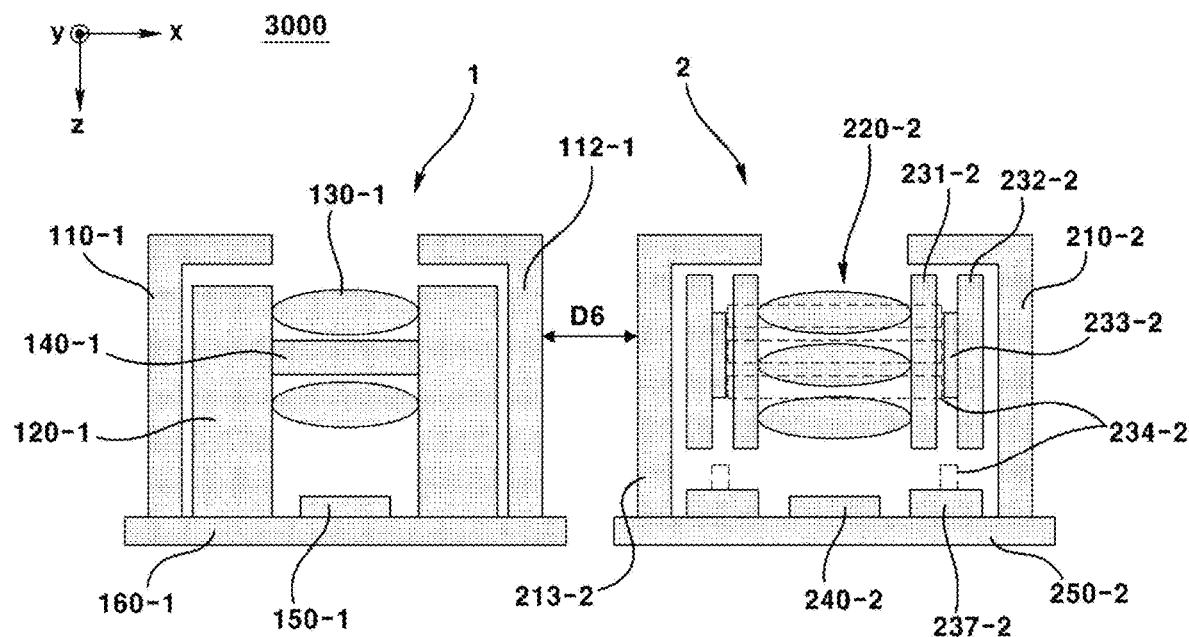
FIG. 21 is a conceptual view illustrating a dual camera module according to a third exemplary embodiment of the present invention.
Figure 22:
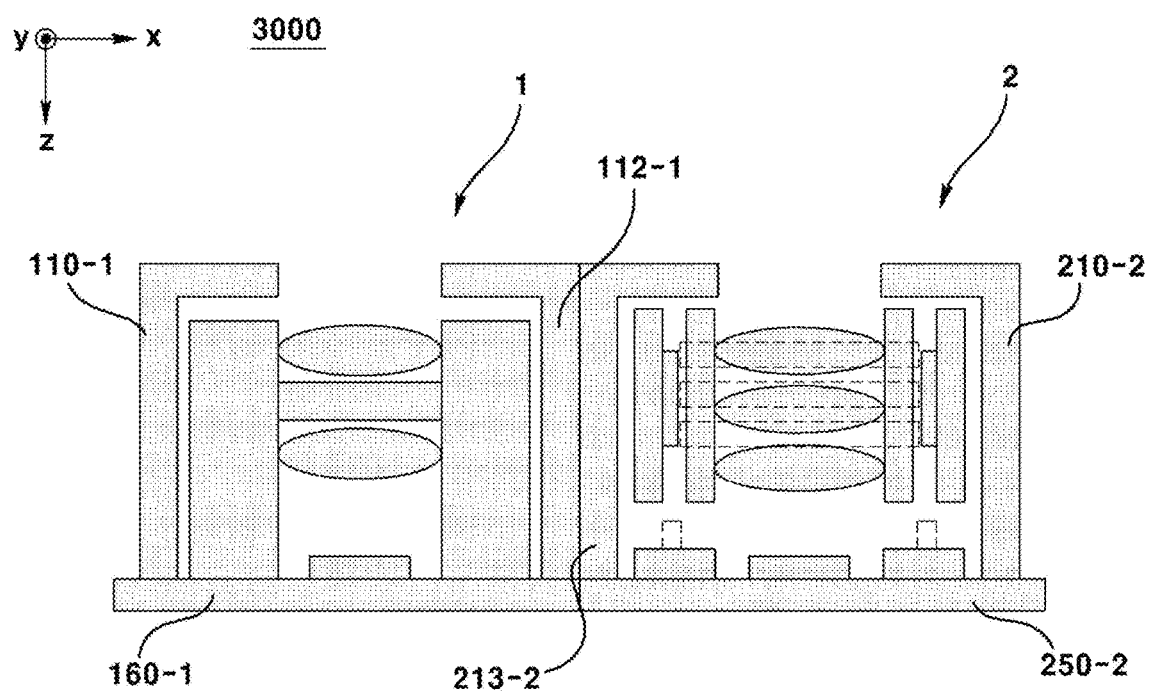
FIG. 22 is a conceptual view illustrating a dual camera module according to a first modification of a third exemplary embodiment of the present invention.
Figure 23:
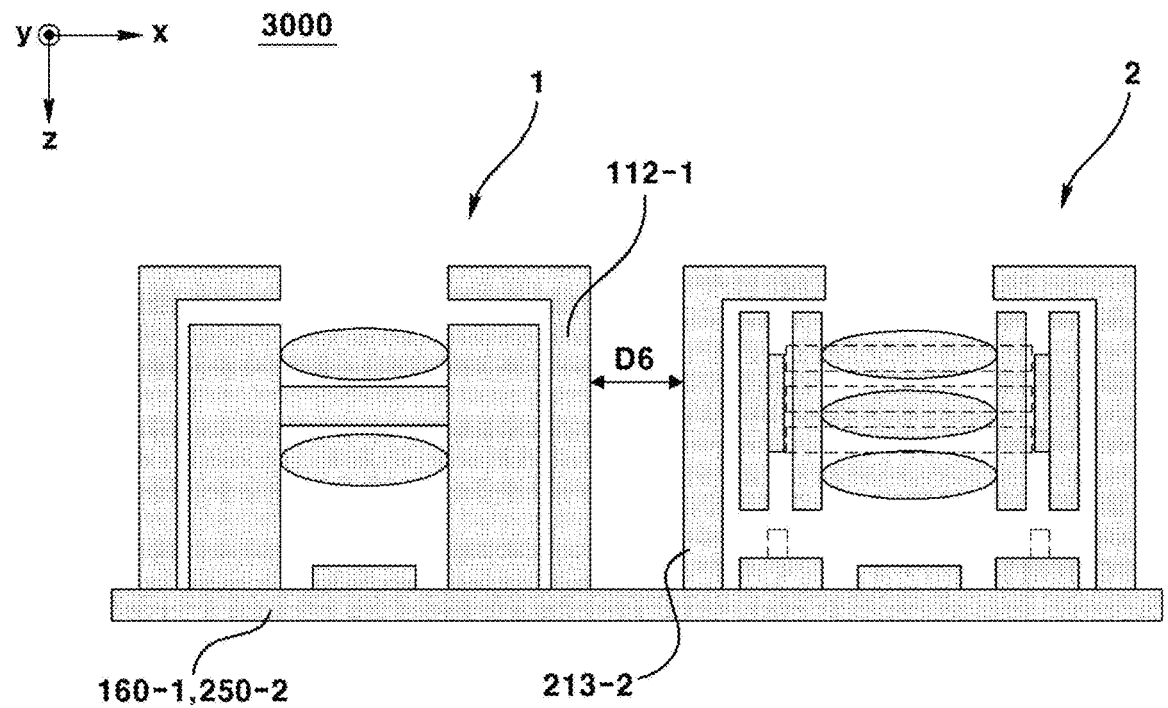
FIG. 23 is a conceptual view illustrating a dual camera module according to a second modification of a third exemplary embodiment of the present invention.
Figure 24:
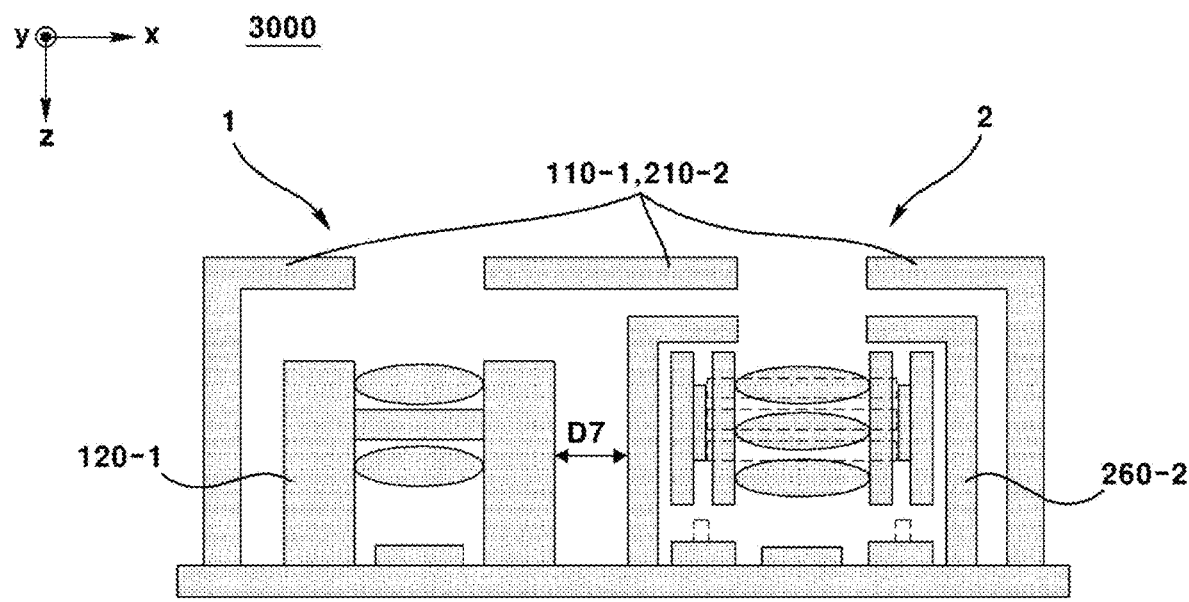
FIG. 24 is a conceptual view illustrating a dual camera module according to a third modification of a third exemplary embodiment of the present invention.

FIG. 9 is a perspective view illustrating a dual camera module according to a third exemplary embodiment, FIG. 21 is a conceptual view illustrating a dual camera module according to a third exemplary embodiment of the present invention, FIG. 22 is a conceptual view illustrating a dual camera module according to a first modification of a third exemplary embodiment of the present invention, FIG. 23 is a conceptual view illustrating a dual camera module according to a second modification of a third exemplary embodiment of the present invention, and FIG. 24 is a conceptual view illustrating a dual camera module according to a third modification of a third exemplary embodiment of the present invention.

Hereinafter, structure of dual camera module (3000) according to a third exemplary embodiment will be described.

The dual camera module (3000) may comprise a first camera module (1), a second camera module (2) and a controller (not shown). A liquid lens camera module (100) may be used for the first camera modules (1). A driving camera module (200) may be used for the second camera module (2). The first camera module (1) and the second camera module (2) may be adjacently disposed. The first camera module (1) and the second camera module (2) may be mutually spaced apart to a front side and a rear side. In this case, the first camera module (1) may be disposed at a front side and the second camera module (2) may be disposed at a rear side. The first camera module (1) and the second camera module (2) may face each other. The first camera module (1) may be a tele-angle camera module. The second camera module (2) may be a wide-angle camera module. That is, a viewing angle of first camera module (1) may be smaller than that of the second camera module (2). Furthermore, at least a portion of viewing angle of first camera module (1) may be comprised within a viewing angle of second camera module (2). Moreover, a viewing angle of first camera module (1) may be all comprised within a viewing angle of second camera module (2). The first camera module (1) may capture a first image (I1). The second camera module (2) may capture a second image (I2). At least a portion of an area of the first image (I1) may be comprised within an area of the second image (I2). All the areas of first image (I1) may be comprised in an area of second image (I2). That is, there may be an overlapping area (0) where an area of first image (I1) and an area of second image (I2) are overlapped. A viewing angle (tele) of first camera module (1) is smaller than a viewing angle (wide) of second camera module (2) in the overlapping area (0), such that resolution and MTF may be higher comprising more pixels for the first image (I1). The first image (I1) and the second image (I2) may be combined. The composite image (C) may have a higher resolution and higher MTF than the second image (I2) because of the first image (I1). That is, a higher quality of composite image (C) may be generated over a case when an image is captured with a single camera module.

The controller may be electrically connected to a first substrate (160-1) of first camera module (1). At the same time, the controller may be electrically connected to a second substrate (250-2) of second camera module (2). The controller may be mounted on the first substrate (160-1) or on the second substrate (250-2). As a result, the controller can receive a first image (I1) from a first image sensor (150-1) of first camera module (1). At the same time, the controller may receive a second image (I2) from a second image sensor (240-2) of the second camera module (2). The controller may combine the first image (I1) and the second image (I2). In this case, an image stitching algorithm may be used.

The dual camera module (2000) according to the second exemplary embodiment may be inferably applied to the dual camera module (3000) of the third exemplary embodiment. However, the first camera module (1) is the liquid lens camera module (100) and the second camera module (2) is the driving camera module (200) in the dual camera module (3000) according to the third exemplary embodiment, such that, when compared with the dual camera module (2000) according to the second exemplary embodiment, the positions of relevant elements are mutually changed in the dual camera module (3000) according to the third exemplary embodiment. However, even in the dual camera module (3000) according to the third exemplary embodiment, it should be noted that the first camera module (1) is a tele-angle camera module and the second camera module is a wide-angle camera module. The first camera module (1) may be inferably applied with the technical idea of the liquid lens camera module (100). The second camera module (2) may be inferably applied with the technical idea of the driving camera module (200).

Hereinafter, structure of dual camera module (3000) according to a first modification of the third exemplary embodiment will be described.

The dual camera module (3000) according to the first modification may be configured such that the first cover member (110-1) and the second cover member (210-2) are brought into contact. In this case, the first cover member (110-1) and the second cover member (210-2) may be bond-coupled by an adhesive material. The first lateral surface (112-1) of first cover member (110-1) and the second lateral surface (213-2) of second cover member (210-2) may be brought into contact. As a result, a gap may disappear between the first camera module (1) and the second camera module (2). Furthermore, the shape and arrangement of first substrate (160-1) and the second substrate (250-2) may be adjusted in order to accomplish a compactly adhered structure between the first camera module (1) and the second camera module (2). In this case, a rear end of the first substrate (160-1) and a front end of the second substrate (250-2) may be mutually contacted. Moreover, the first substrate (160-1) and the second substrate (250-2) may be integrally formed.

Hereinafter, structure of dual camera module (3000) according to a second modification of the third exemplary embodiment will be described.

The dual camera module (3000) according to the second modification may be configured such that a first substrate (160-1) and the second substrate (250-2) are integrally formed. In this case, a front end of the first substrate (160-1) and a rear end of the second substrate (250-2) may be connected. That is, the front end of the first substrate (160-1) and the rear end of the second substrate (250-2) may be soldered by a connector. Furthermore, the first substrate (160-1) and the second substrate (250-2) may be manufactured with a single element. In this case, the integrally formed first substrate (160-1) and second substrate (250-2) may take a rectangular plate shape having a length to a front side and to a rear side.

Hereinafter, structure of dual camera module (2000) according to a third modification of the third exemplary embodiment will be described.

A first cover member (110-1) and the second cover member (210-2) may be integrally formed in the dual camera module (3000) according to the third modification. In this case, the first cover member (110-1) and the second cover member (210-2) may share an inner space. A first lateral surface (112-1) and a second lateral surface (213-2) may disappear, and an upper surface of first cover member (110-1) and an upper surface of second cover member (210-2) may be connected to form an integrated cover member. An upper surface of integrally formed first and second cover members (110-1,210-2) may be aligned with an optical axis of the first camera module (1) to form a first transmittance window (111-1). Furthermore, a second transmittance window (211-2) may be formed by allowing being spaced apart from the first transmittance window (111-1) to a rear side to be aligned with an optical axis of second camera module (2). Furthermore, a bottom surface of the integrally formed first and second cover members (110-1, 210-2) may be disposed with a first substrate (160-1) and a second substrate (250-2). In this case, the first substrate (160-1) and the second substrate (250-2) may be integrally formed as in the second modification. An inside of the integrally formed first and second cover members (110-1, 210-2) may be accommodated by a first lens holder (120-1), a first lens module (130-1), a first liquid lens (140-1), a first image sensor (150-1), a first substrate (160-2), a second lens module (220-2), a second lens driving device (230-2), a second image sensor (240-2) and a second substrate (250-2). Toward this end, the integrally formed first and second cover members (110-1,210-2) may take a hollowed shape having a length to a front side and a rear side. The integrally formed first and second cover members (110-1,210-2) may take a hollowed block shape having a length to a front side and to a rear side. In this case, in order to protect the second lens driving device (230-2), a second complementary cover member (260-2) may be added. The second complementary cover member (260-2) may take a hollowed shape to accommodate therein the lens driving device (230-2). The second complementary cover member (260-2) may take a hollowed cubic shape. The second complementary cover member (260-2) may be formed with a metal material to shield an outside electromagnetic wave. As a result, the lens driving device (230-2) may be electrically stable. Furthermore, the lens driving device (230-2) may be protected from outside physical impact. In this case, a shortest distance (D6) between the second complementary cover member (260-2) and the first lens holder (120-1) may be less than 2 mm. A rear lateral surface of second complementary cover member (260-2) and a front lateral surface of first lens holder (120-1) may be so disposed as to face each other. In this case, a shortest distance between the front lateral surface of the second complementary cover member (260-2) and the front lateral surface of the first lens holder (120-1) may be less than 2 mm. The modifications thus described according to the third exemplary embodiment may provide a dual camera module (3000) having a compact structure by integrating the elements of the first camera module (1) and the second camera module (2). Furthermore, a discrete distance between the first camera module (1) and the second camera module (2) can be further narrowed.

Hereinafter, operation and effect of dual camera modules (1000,2000,3000) according to the first, second and third exemplary embodiments will be described with reference to the accompanying drawings.

Figure 25:
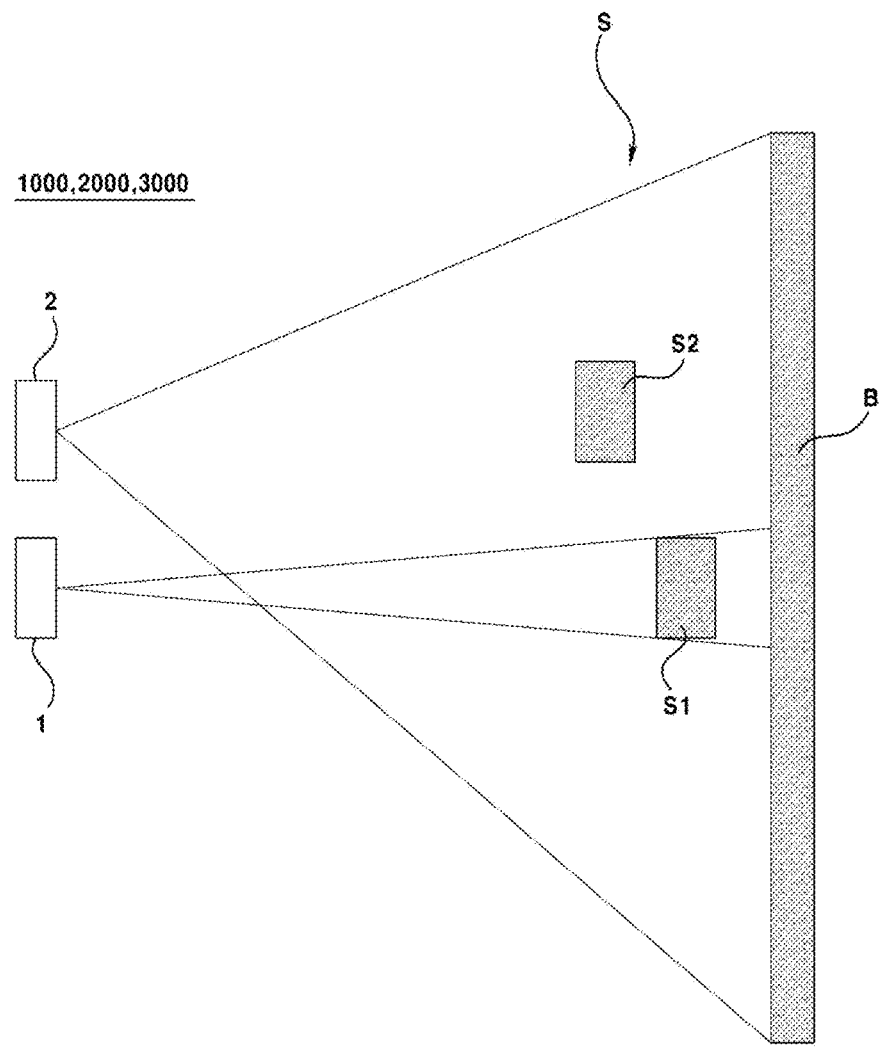
FIG. 25 is a conceptual view captured by a dual camera module according to first, second and third exemplary embodiments of the present invention.
Figure 26:
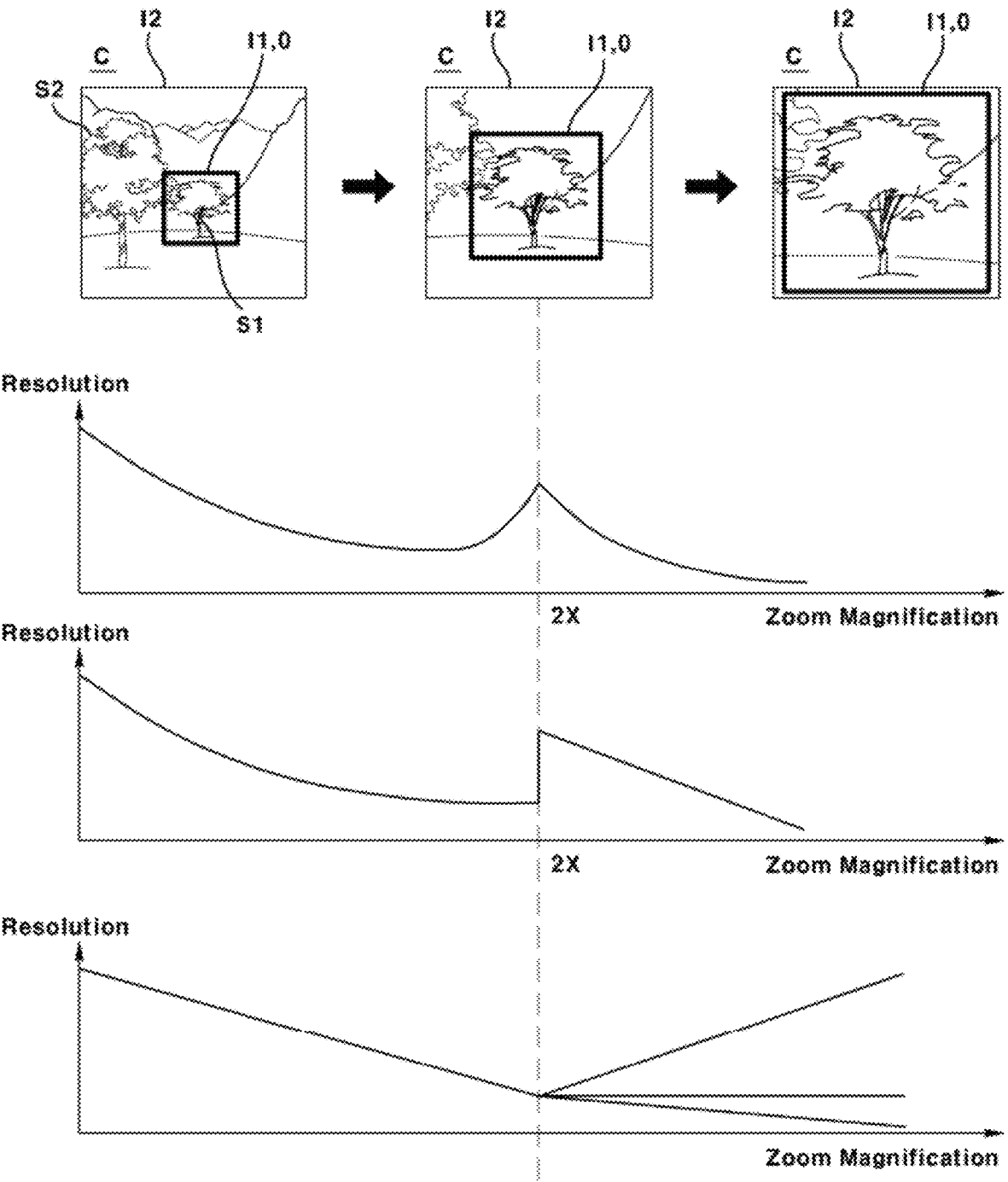
FIG. 26 is a conceptual view illustrating changes in resolution when a composite image is digitally-zoomed.

FIG. 25 is a conceptual view captured by a dual camera module according to first, second and third exemplary embodiments of the present invention, and FIG. 26 is a conceptual view illustrating changes in resolution when a composite image is digitally-zoomed where changes in MTF value is shown.

A subject (S), an object to be captured by the dual camera module (1000, 2000, 3000), may comprise first and second subjects (S1,S2), which are main objects, and a background subject (B) which is a subordinate object. Furthermore, a distance between the first subject (S1) and the dual camera module (1000, 2000, 3000) may be more distant than a distance between the second subject (S2) and the dual camera module (1000, 2000, 3000). That is, a conventional dual camera module cannot match focuses of the first and second subjects (S1,S2) at the same time.

The first camera module (1), which is a tele-angle camera module, may capture a first image (I1) comprising a first subject (S1). The camera module (2) which is a wide-angle camera module, may capture a second image (I2) comprising the first and second subjects (S1,S2) and a background subject (B). Furthermore, at least a portion or all of viewing angle of the first camera module may be comprised in a viewing angle of second camera module (2), such that there may be an overlapped area (0) between the first image (I1) and the second image (I2).

Hereinafter, an explanation will be provided by presuming a case where a viewing angle of first camera module (1) is all comprised within a viewing angle of second camera module (2) to match the first image (I1) with the overlapped area (0).

The first camera module (1) and the second camera module (2) can simultaneously perform an AF function and/or OIS function to capture the first and second images (I1, I2). Therefore, a focus of the first subject (S1) and a focus of the second subject (S2), each having a different distance, can be simultaneously matched. Furthermore, a shake caused by external force can be corrected. As a result, the MTF of the first image (I1) and the second image (I2) can be increased.

The controller can generate a composite image (C) by receiving the first image (I1) and the second image (I2). In this case, an image stitching algorithm may be used. The overlapped area (0) of the composite image (C) may be existent only with the second image (I2). Furthermore, the overlapped area (0) of the composite image (C) may be existent with the first image (I1) and a second image (I2) synchronized with the first image (I1).

The first camera module may be a tele-angle camera module, and the second camera module (2) may be a wide-angle camera module. Thus, the resolution and MTF of the first image (I1) at the overlapped area (0) of composite image (C) may be higher than those of the second camera module (2). As a result, a high quality composite image (C) having a high resolution and MTF may be generated over a case where an image is captured using only the second camera module (2). As stated in the foregoing, the first camera module (1) and the second camera module (2) can simultaneously perform the AF function and the OIS function, such that an MTF of first image (I1) and an MTF of second image (I2) can be increased. As a result, a composite image (C) of highest quality can be generated.

FIG. 26 is a conceptual drawing illustrating a case where a composite image (C) is digitally-zoomed and magnification is enlarged based on the overlapped area (0). A horizontal axis in FIG. 26 may be defined as a digital zoom magnification, and a vertical axis may be defined as an MTF. The overlapped area (C) of composite image (C) is an image captured with a tele-angle and may have a higher resolution and MTF over other areas of composite image (C) where only second image (I2) is existent. Thus, when magnification of an image is enlarged by digital-zooming, the MTF of the composite image (C) may be decreased but a decrease rate of MTF may be lowered or maintained as the ratio of overlapped area (O) is increased.

The dual camera modules (1000, 2000, 3000) according to the first, second and third exemplary embodiments may be such that the first camera module (1) and the second camera module (2) are extremely closely contacted or mutually abutted. This is because no electromagnetic interference between the first and second camera modules (1, 2) is received. Furthermore, this is because the first and second camera modules have a compact structure. Therefore, there is almost no parallax between the first and second camera modules (1, 2). As a result, a synchronization of first image (I1) and the second image (I2) in the overlapped area (O) can be increased to generate a high quality composite image (C). Moreover, it is easy to design to allow all the viewing angles of first camera module (1) to be comprised in the viewing angle of second camera module (2). Furthermore, even if a viewing angle of first camera module (1) is narrowed, all of the viewing angles of first camera module (1) can be comprised in the viewing angle of second camera module (2). If a discrete distance between the first and second camera modules (1, 2) is great, there may be a limit in the optical design thus described.

Hereinafter, an optical device applied with a dual camera module according to the first, second and third exemplary embodiments will be described.

The optical device may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and may comprise any device capable of capturing an image or a photograph.

The optical device may comprise a main body (not shown), a dual camera module (1000, 2000, 3000) and a display part (not shown). The controller (not shown) of the dual camera module (1000, 2000, 3000) may be comprised in the optical device.

The main body may form an external shape of an optical device. The main body may comprise a cubic shape, for example. However, the present invention is not limited thereto. As a modification, the main body may be at least partially rounded. The main body may accommodate the dual camera module (1000, 2000, 3000). One surface of a main body may be disposed with a display part.

The dual camera module (1000, 2000, 3000) may be disposed on the main body. The dual camera module may be disposed at one surface of main body. At least one portion of the dual camera module may be accommodated into the main body. The dual camera module may capture an image of a subject.

The display part may be disposed on the main body. The display part may be disposed at one surface of main body. That is, the display part may be disposed on a same surface as that of dual camera module. Alternatively, the display part may be disposed at the other surface of main body. The display part may be disposed on a surface disposed at an opposite surface of a surface disposed with the dual camera module. The display part may output an image captured by the dual camera module.

Now, an operation method of camera module according to a fourth exemplary embodiment will be described.

Combinations of each block of attached block diagrams and each step of flowchart may be implemented by algorithm or computer program instructions comprised of firmware, software, or hardware. These algorithms or computer program instructions may be mounted on a processor of general-purpose computers, special computers or other programmable digital signal processing devices, such that the instructions performed through the processors of computers or processors of other programmable data processing devices can generate means for implementing functions explained at each block of block diagrams or each step of flowcharts. These algorithms or computer program instructions may be stored in computer useable or computer readable memories capable of aiming for computer or other programmable data processing devices in order to implement the functions by way of special methods, such that the instructions stored in the computer useable or computer readable memories may generate manufacturing items comprising instruction means for performing functions explained in each block of block diagrams or each step of flow charts. The computer program instructions may be also mounted on computers or programmable data processing devices, such that a series of operation steps are implemented on the computers or other programmable data processing devices to generate the computer-implementable processes, whereby the instructions performing the computers or other programmable data processing devices can also provide steps for implementing the functions explained at each block of block diagrams or each step of flowcharts.

Furthermore, each block or each step may indicate a module, a segment or a portion of codes comprising one or more implementable instructions for implementing the special logic function(s). Moreover, it should be noted that, in several substitutable exemplary embodiments, the functions mentioned in the blocks or steps may be generated by being deviated from orders. For example, continuously illustrated two blocks or steps may be, in fact, simultaneously and substantially implemented, or alternatively, each block or step may be sometimes implemented in a reverse order depending on relevant functions.

Like reference numerals may indicate like elements across the specification.

Figure 27:
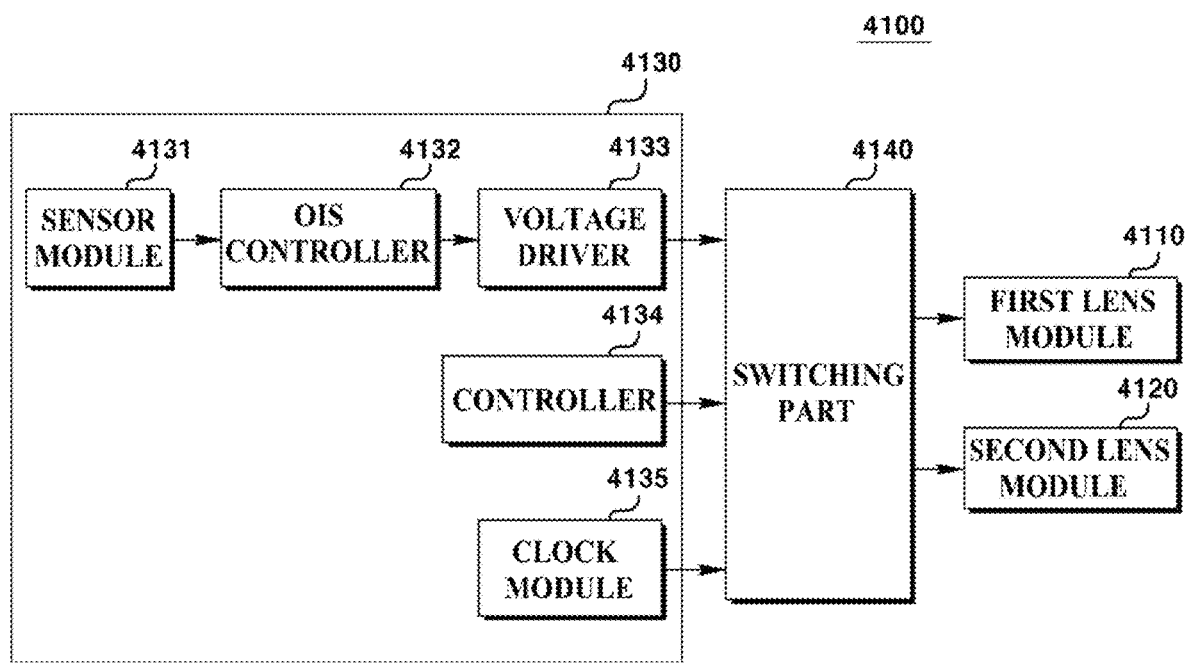
FIG. 27 is a block diagram illustrating a configuration of a camera module according to a fourth exemplary embodiment of the present invention.

FIG. 27 is a block diagram illustrating a configuration of a camera module according to a fourth exemplary embodiment of the present invention.

First, as illustrated in FIG. 27, a camera module (4100) according to the present invention may comprise a first lens module (4110), a second lens module (4120), a driving part (4130) and a switching part (4140).

The first lens module (4110) and the second lens module (4120) may comprise at least one lens out of a zoom lens and a dual lens. Furthermore, the first lens module (4110) and the second lens module (4120) may comprise a first liquid lens forming a first interface by comprising two or more liquids, and one or more solid lenses. Here, the first liquid lens may comprise two or more liquids forming a first interface, and may receive from a switching part (4140) a voltage outputted from a voltage driver (4133) for driving the first liquid lens. Moreover, the second liquid lens may comprise two or more liquids forming a second interface, and may receive from the switching part (4140) a voltage outputted from the voltage driver (4133) for driving the second liquid lens. Hereinafter, a detailed explanation on lens modules (4110, 4120) will be made in detail with reference to FIG. 28.

The driving part (4130) may comprise a sensor module (4131), an OIS (Optical Image Stabilization) controller (4132), a voltage driver (4133), a controller (4134) and a clock module.

The sensor module (4131) may be a sensor for measuring a position and a direction of camera module (4100), and may comprise all sensors measuring the direction and position of camera module (4100) such as a gyroscope sensor and an accelerometer. The OIS controller (4132) may perform an OIS function through changes in first interface and second interface. The voltage driver (4133) may output a voltage for driving the first liquid lens and the second liquid lens. For example, the voltage driver (4133) may output 0 V (Voltage) ~75V for driving the first liquid lens and the second liquid lens.

The controller (4134) may transmit, to the switching part (4140), a command to short-circuit all two switches comprised in the switching part (4140), a command to open any one switch of the two switches comprised in the switching part (4140), or a command to short-circuit the remaining one switch.

For example, the controller (4134) may transmit, to the switching part (4140), a command to short-circuit the first switch out of the two switches comprised in the switching part (4140) for a predetermined time (e.g., three seconds), and a command to open the second switch for a predetermined time (e.g., three seconds).

Thereafter, when the predetermined time elapses, the controller (4134) may transmit, to the switching part (4140), a command to short-circuit the second switch out of two switches comprised in the switching part (4140) for a predetermined time (e.g., three seconds), and a command to open the first switch for a predetermined time (e.g., three seconds).

The clock module (4135) may generate a clock signal for implementing a synchronization of the driving part (4130) with two lens modules {first lens module (4110) and second lens module (4120)}. For example, the clock module (4135) may generate a clock signal for synchronizing the driving part (4130) with the first lens module (4110) using a digital value which is an arbitrary value, and then generate a clock signal for synchronizing the driving part (4130) with the second lens module (4120) using a digital value which is an arbitrary value.

The switching part (4140) may comprise one or two or more switches, and may transmit a same signal generated from the driving part (4130) to the first liquid lens and the second liquid lens. Here, the same signal may be defined by a same voltage value outputted from the voltage driver (4133) within the driving part (4130). For example, the switching part (4140) may receive from the voltage driver (4133) 0 V (Voltage)~75 V for driving the first liquid lens and the second liquid lens.

Furthermore, the switching part (4140) may open or short-circuit two switches respectively by receiving, from the driving part (4130), a command to open any one switch out of two switches comprised in the switching part (4140), and to short-circuit the remaining one switch. For example, the switching part (4140) may short-circuit a first switch for a predetermined time and open the second switch for a predetermined time by receiving a command to short-circuit the first switch out of two switches comprised in the switching part (4140), and a command to open the second switch for a predetermined time.

Thereafter, the switching part (4140) may transmit from the controller to the switching part (4140) a command to short-circuit the second switch out of two switches comprised in the switching part (4140) for a predetermined time and a command to open the first switch for a predetermined time.

Furthermore, the switching part (4140) may receive, from the clock module (4135), a clock signal for implementing a synchronization of the driving part (4130) with two lens modules {first lens module (4110) and second lens module (4120)} and sequentially transmit the clock signal to two lens modules. For example, the switching part (4140) may receive, from the clock module (4135), an arbitrary value which is a digital value for synchronizing the driving part (4130) with the first lens module (4110) and then transmit the arbitrary value which is a digital value to the first lens module (4110).

Then, the switching part (4140) may receive from the clock module (4135) an arbitrary value which is a digital value for synchronizing the driving part (4130) with the first lens module (4110) and then transmit the arbitrary value which is the received digital value to the first lens module (4110).

Hereinafter, a camera module and an operation method of the camera module will be described in detail with reference to FIG. 27.

Figure 28:
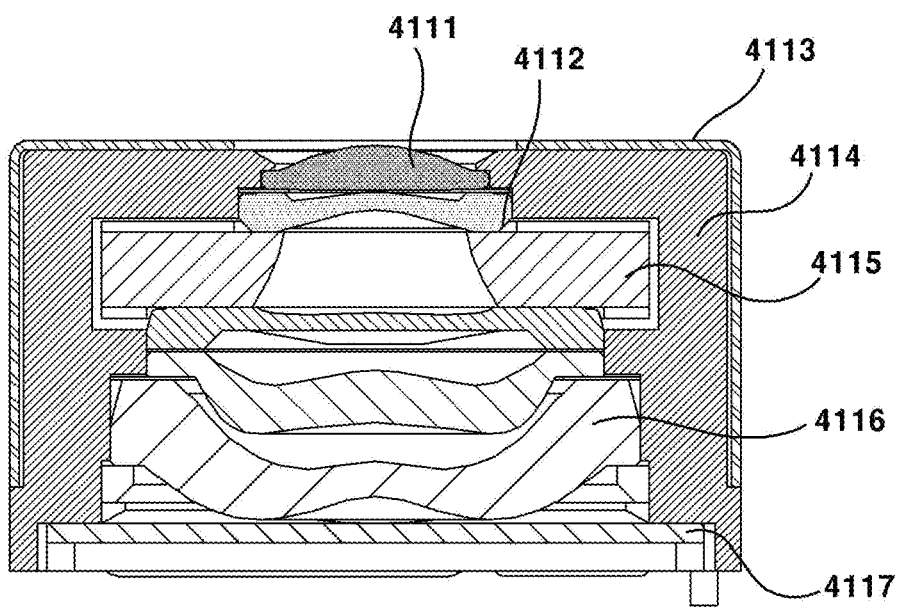
FIG. 28 is a block diagram illustrating a configuration of a first lens module and a second lens module according to a fourth exemplary embodiment of the present invention.

FIG. 28 is a block diagram illustrating a configuration of a first lens module and a second lens module according to a fourth exemplary embodiment of the present invention.

As shown in FIG. 28, the first lens module (4110) and the second lens module (4120) may comprise a first lens part (4111), a slant part (4112), a cover member (4113), a lens holder (4114), a liquid lens (4115), a second lens part (4116) and an infrared filter (4117).

The first lens part (4111) may comprise one or more solid lenses. The lenses in the first lens part (4111) may be disposed in a stacked manner. A bottom surface of lowermost lens of the first lens part (4111) may be disposed with a slant part (4112) along an outer circumference. In this case, the slant part (4310) may be downwardly inclined toward an inside of the lens holder (4114). When the outer circumference at the bottom surface of the lowermost lens is angled, there may be generated a friction with an upper plate, and the friction with the upper plate can be inhibited when the liquid lens (4115) is inserted, and that is why the slant part (4112) is required to inhibit the friction.

The liquid lens (4115) may be a lens for performing an AF function and an OIS function by controlling a curvature of interface between a conductive liquid and a non-conductive liquid. When the conductive liquid and non-con-conductive liquid are accommodated and electrodes and insulators are stacked to apply a voltage to the electrodes, an electro-wetting phenomenon is generated where a contact angle of inner surface of cavity coated with the conductive liquid and insulators is changed in response to intensity of applied voltage.

The second lens part (4116) may comprise one or more solid lenses. The lenses of second lens part (4116) may be disposed in a stacked manner. The lenses of second lens part (4116) may be fixed at an upper surface by being contacted by a second lens reception hole staircase or an O-ring, and fixed at a lower surface by being supported by a lower lens or an O-ring. An upper surface of uppermost lens of the second lens part (4116) may be fixed by being contacted to a lower surface of the liquid lens (4115).

The infrared filter (4117) may shield a light of infrared region from being incident on an image sensor. The infrared filter (4117) may be interposed between a lens module and a main board. The infrared filter (4117) may be formed with film material or glass material. The infrared filter (4117) may be formed by allowing an infrared cut-off coating material to be coated on a plate-shaped optical filter such as an imaging plane protection cover glass or a cover glass. The infrared filter (4117) may be an infrared cut-off filter or an infrared absorption filter.

FIGS. 29 to 32 are schematic views illustrating an operation of a switch comprised in a switching part according to a fourth exemplary embodiment of the present invention.

Hereinafter, it is assumed that a switching part (4140) receives a predetermined voltage from a voltage driver (4133) for driving a first liquid lens and a second liquid lens, and receives an arbitrary value, which is a digital signal, from a clock module (4135) for synchronization with a driving part (4130) and a lens module (4110, 4120), and transmits the same to the lens module (4110, 4120).

The switching part (4140) may receive a dictionary-defined digital value from the controller (4134). Here, the dictionary-defined digital value may be defined as a value for driving a switch comprised in the switching part (4140). For example, an explanation is given for a case where two switches are provided for the switching part (4140), and the dictionary-defined digital values are respectively "00, 01, 10, 11".

Figure 29:
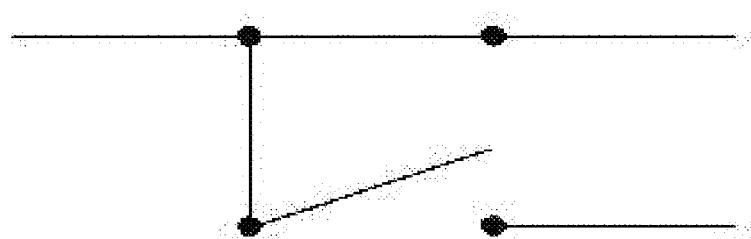
FIGS. 29 to 32 are schematic views illustrating an operation of a switch comprised in a switching part.

First, as illustrated in FIG. 29, when the switching part (4140) receives a digital value of "00" from the controller (4134), the switching part (4140) may short-circuit an upper switch disposed at an upper end out of two switches disposed on the switching part (4140), and open a switch disposed at a lower end.

Figure 30:
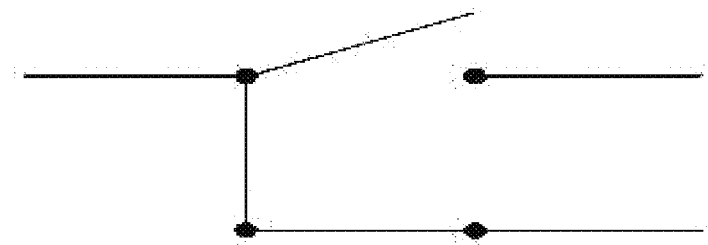

Furthermore, as shown in FIG. 30, when the switching part (4140) receives a digital value of "01" from the controller (4134), the switching part (4140) may open an upper switch disposed at an upper end out of two switches disposed on the switching part (4140), and shirt-circuit a switch disposed at a lower end.

Figure 31:
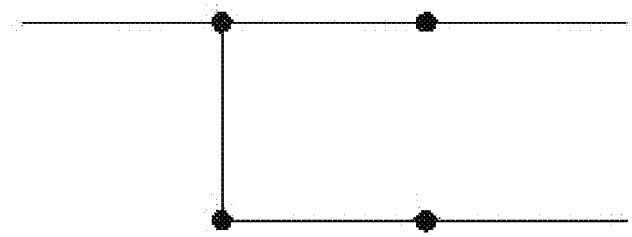

Moreover, as illustrated in FIG. 31, when the switching part (4140) receives a digital value of "10" from the controller (4134), the switching part (4140) may short-circuit all two switches disposed at the upper end and the lower end disposed on the switching part (4140).

Figure 32:
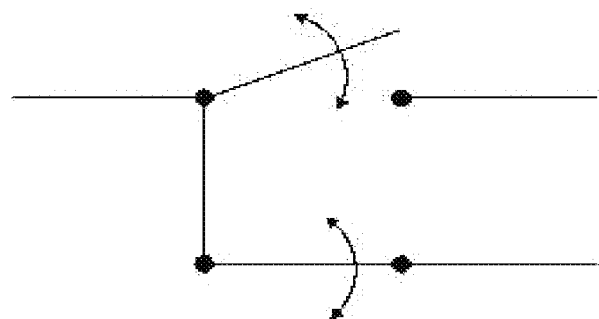

Moreover, as illustrated in FIG. 32, when the switching part (4140) receives a digital value of "11" from the controller (4134), the switching part (4140) may short-circuit an upper switch disposed at an upper end out of two switches disposed on the switching part (4140), and open a switch disposed at a lower end for a predetermined time.

Thereafter, the switching part (4140) may open an upper switch disposed at an upper end out of two switches disposed on the switching part (4140), and shirt-circuit a switch disposed at a lower end after a predetermined time elapses. That is, the switching part (4140) may repetitively perform an operation of sequentially short-circuiting and opening two switches disposed on the switching part (4140) for a predetermined time.

Figure 33:
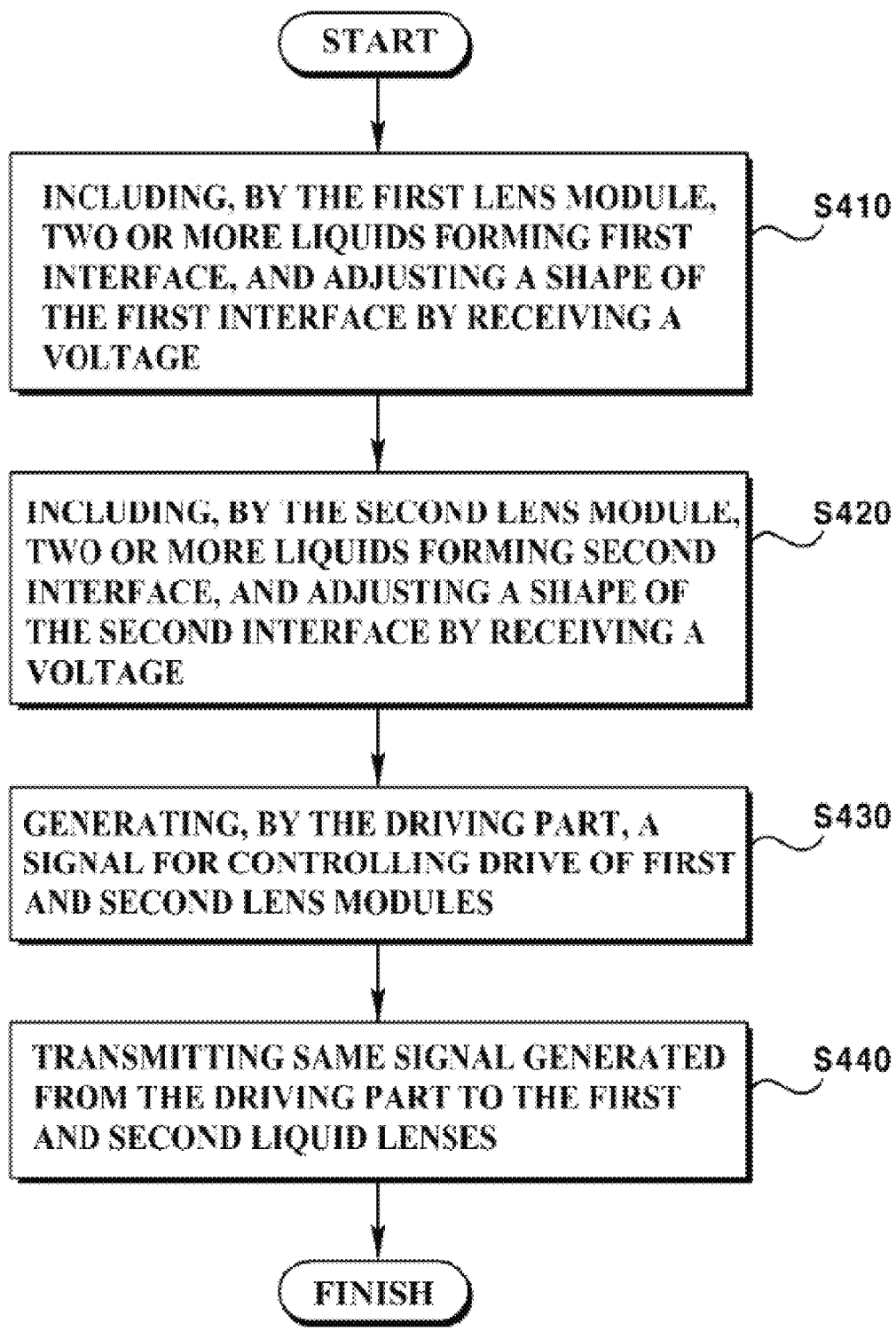
FIG. 33 is a flowchart illustrating a first operational order of a camera module according to a fourth exemplary embodiment of the present invention.

FIG. 33 is a flowchart illustrating a first operational order of a camera module according to a fourth exemplary embodiment of the present invention.

First, as illustrated in FIG. 33, the first lens module (4110) may comprise two or more liquids forming a first interface, and adjust a shape of the first interface by receiving a voltage (S410).

To be more specific, the first lens module (4110) may receive a voltage from the voltage driver (4133) at the driving part (4130) through the switching part (4140), and adjust the shape of first interface of first liquid lens disposed at the first lens module (4110).

Thereafter, the second lens module (4120) may comprise two or more liquids forming a second interface and adjust a shape of the second interface by receiving a voltage (S420). To be more specific, the second liquid lens module (4120) may receive a voltage from the voltage driver (4133) at the driving part (4130) through the switching part (4140), and adjust the shape of second interface of second liquid lens disposed at the second lens module (4120).

Thereafter, the driving part (4130) may generate a signal for controlling the drive of the first and second lens modules (4110, 4120) (S430). To be more specific, the voltage driver (4133) may output a voltage for driving the first and second liquid lenses, the controller (4134) may generate a digital signal for opening all two switches comprised in the switching part (4140) or generate a digital signal for opening any one switch of the two switches comprised in the switching part (4140) or generate a digital signal for opening any one switch of the two switches and short-circuiting the remaining other switch for a predetermined time, and the clock module (4135) may generate a clock signal for performing a synchronization of the driving part (4130) with two lens modules {first lens module (4110) and the second lens module (4120)}.

Thereafter, the switching part (4140) may transmit the same signal generated from the driving part to the first liquid lens and the second liquid lens (S440). That is, the switching part (4140) may transmit the same voltage value outputted from the voltage driver (4133) within the driving part (4130) to the first liquid lens and the second liquid lens.

FIG. 34 is a flowchart illustrating a second operational order of a camera module according to a fourth exemplary embodiment of the present invention.

First, as shown in FIG. 34, the first lens module (4110) may comprise two or more liquids forming a first interface, and adjust a shape of the first interface by receiving a voltage (S510).

To be more specific, the first lens module (4110) may receive a voltage from the voltage driver (4133) at the driving part (4130) through the switching part (4140), and adjust the shape of first interface of first liquid lens disposed at the first lens module (4110).

Thereafter, the second lens module (4120) may comprise two or more liquids forming a second interface and adjust a shape of the second interface by receiving a voltage (S520). To be more specific, the second liquid lens module (4120) may receive a voltage from the voltage driver (4133) at the driving part (4130) through the switching part (4140), and adjust the shape of second interface of second liquid lens disposed at the second lens module (4120).

Thereafter, the driving part (4130) may generate a signal for controlling the drive of the first and second lens modules (4110, 4120) (S530). To be more specific, the voltage driver (4133) may output a voltage for driving the first and second liquid lenses, the controller (4134) may generate a digital signal for opening all two switches comprised in the switching part (4140) or generate a digital signal for opening any one switch of the two switches comprised in the switching part (4140) or generate a digital signal for opening any one switch of the two switches and short-circuiting the remaining other switch for a predetermined time, and the clock module (4135) may generate a clock signal for performing a synchronization of the driving part (4130) with two lens modules {first lens module (4110) and the second lens module (4120)}.

Thereafter, the switching part (4140) may selectively transmit a signal generated from the driving part to any one liquid lens out of the first liquid lens and the second liquid lens (S540). That is, the switching part (4140) may selectively transmit mutually different voltage values outputted from the voltage driver (4133) within the driving part (4130) to any one liquid lens out of the first liquid lens and the second liquid lens.

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention.

Furthermore, terms such as "comprises", "comprising", "have", "having", "comprises" and/or "comprising" as used herein mean that the relevant elements are embedded, unless otherwise described, such that the mentioned elements are not excluded but may be further comprised.

Unless otherwise defined, all terms comprising technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments.

The scope of protection of the present invention should be interpreted by the following claims and all technical ideas within the equivalent scope should be interpreted as being comprised in the scope of right of the present invention.

The invention claimed is:

1. A camera module comprising:
a first lens module comprising a first liquid lens comprising first and second liquids to form a first interface, and at least one first solid lens;
a second lens module comprising a second liquid lens comprising two or more liquids to form a second interface, and at least one second solid lens;
a driving device configured to generate a signal to controllably drive the first lens module and the second lens module; and
a switching device configured to selectively transmit the signal generated from the driving device to one liquid lens of the first liquid lens and the second liquid lens;
wherein the driving device comprises a controller configured to repeat, for a preset time, an operation of opening one switch of two switches comprised in the switching device and short-circuiting the other switch,
wherein the first lens module and the second lens module have mutually different viewing angles, and
wherein the first lens module is disposed on a first optical axis and the second lens module is disposed on a second optical axis, the first optical axis and the second optical axis being in parallel to each other.

2. The camera module of claim 1, wherein a same signal generated from the driving device is transmitted to the first liquid lens and the second liquid lens.

3. The camera module of claim 1, wherein the driving device comprises:
a sensor configured to measure a position and a direction;
an optical image stabilization (OIS) controller configured to perform an optical image stabilization function by allowing the first interface and the second interface to be changed;
a voltage driver configured to output a voltage for driving the first liquid lens and the second liquid lens; and
a clock module configured to generate a clock configured to perform a synchronization with the first lens module and the second lens module.

4. The camera module of claim 2, wherein the transmission of the same signal generated from the driving device to the first liquid lens and the second liquid lens is a transmission of a same voltage value outputted from a voltage driver within the driving device to the first liquid lens and the second liquid lens, and
wherein the first lens module and the second lens module have a same focus.

5. The camera module of claim 1, wherein the driving device comprises:
a sensor configured to measure a position and a direction;
an optical image stabilization (OIS) controller configured to perform an optical image stabilization function by allowing the first interface and the second interface to be changed;
a voltage driver configured to output a voltage for driving the first liquid lens and the second liquid lens; and
a clock module configured to generate a clock configured to perform a synchronization with the first lens module and the second lens module.

6. The camera module of claim 1, wherein in the first liquid lens a shape of the first interface is adjusted by receiving a first voltage, and
wherein in the second liquid lens a shape of the second interface is adjusted by receiving a second voltage.

7. The camera module of claim 1, wherein a viewing angle of the second lens module comprises at least a part of a viewing angle of the first lens module such that there is an overlapping area between a first image captured by the first lens module and a second image captured by the second lens module so as to enable a composite image formed by combining the first image and the second image.

8. The camera module of claim 1, wherein the first liquid lens comprises the first liquid, the second liquid different from the first liquid, wherein the first interface is formed between the first liquid and the second liquid; wherein the second liquid lens comprises a third liquid, a fourth liquid different from the third liquid, and wherein the second interface is formed between the third liquid and the fourth liquid.

9. The camera module of claim 1, wherein the first lens module is focused by varying the first interface of the first liquid lens, and the second lens module is focused by varying the second interface of the second liquid lens.

10. The camera module of claim 1, wherein the first interface of the first liquid lens is formed with a first curvature when a subject is disposed at a position spaced apart from the first lens module by a first distance, and the second interface of the second liquid lens is formed with a second curvature when the subject is disposed at a position spaced apart from the second lens module by the first distance, and wherein the first curvature of the first interface is different from the second curvature of the second interface.

11. The camera module of claim 1, wherein a focal length of the first liquid lens is varied according to a distance between the first liquid lens and the subject, when the first lens module is focused,
wherein the focal length of the first liquid lens is shortened when the subject approaches the first liquid lens,
wherein a focal length of the second liquid lens is varied according to a distance between the second liquid lens and the subject, when the second lens module is focused, and
wherein the focal length of the second liquid lens is shortened as the subject approaches the second liquid lens.

12. The camera module of claim 1, wherein the first lens module comprises a first electrode disposed in a direction perpendicular to the first optical axis of the first lens module and a second electrode comprising a portion in a direction perpendicular to the first optical axis of the first lens module and another portion inclined with respect to the first optical axis of the first lens module,
wherein the first liquid lens comprises a first cavity disposed with the first and second liquids, one of the first and second liquids being electrically connected with the first electrode and the other of the first and second liquids being electrically insulated from any electrode,
wherein an upper diameter of the first cavity is greater than a lower diameter of the first cavity,
wherein a diameter of the first cavity is gradually reduced from an upper part to a lower part,
wherein the second liquid lens comprises a second cavity disposed with two mutually different liquids,
wherein an upper diameter of the second cavity is greater than a lower diameter of the second cavity, and
wherein a diameter of the second cavity is gradually reduced from an upper part to a lower part.

13. The camera module of claim 1, wherein the first lens module comprises a first electrode disposed in a direction perpendicular to the first optical axis of the first lens module and a second electrode comprising a portion in a direction perpendicular to the first optical axis of the first lens module and another portion inclined with respect to the first optical axis of the first lens module,
wherein the first liquid lens comprises a first cavity receiving the first and second liquids, one of the first and second liquids being electrically connected with the first electrode and the other of the first and second liquids being electrically insulated from any electrode,
wherein a lower diameter of the first cavity is greater than an upper diameter of the first cavity,
wherein a diameter of the first cavity is gradually reduced from a lower part to an upper part,
wherein the second liquid lens comprises a second cavity receiving two mutually different liquids,
wherein a lower diameter of the second cavity is greater than an upper diameter of the second cavity, and
wherein a diameter of second cavity is gradually reduced from a lower part to an upper part.

14. A method for operating a camera module comprising:
adjusting, in a first lens module comprising two or more liquids forming a first interface, a shape of the first interface by receiving a first voltage;
adjusting, in a second lens module comprising two or more liquids forming a second interface, a shape of the second interface by receiving a second voltage;
generating, by a driving device, a signal controlling driving of the first lens module and the second lens module; and
transmitting a same signal generated from the driving device to the first liquid lens and the second liquid lens, or selectively transmitting, by a switching device, a signal generated from the driving device to one liquid lens of the first liquid lens and the second liquid lens,
wherein the step of generating, by the driving device, a signal for controlling driving of the first lens module and the second lens module includes repeating for a preset time, by a controller, a step of opening one switch of two switches comprised in the switching device, and short-circuiting the other switch,
wherein the first lens module and the second lens module have mutually different viewing angles, and
wherein the first lens module is disposed on a first optical axis and the second lens module is disposed on a second optical axis, the first optical axis and the second optical axis being in parallel to each other.

15. The method of claim 14, wherein the step of generating, by the driving device, a signal for controlling driving of the first lens module and the second lens module comprises:
measuring, by a sensor, a position and a direction;
performing, by an optical image stabilization controller, an optical image stabilization function by allowing the first interface and the second interface to be changed;
outputting, by a voltage driver, a voltage for driving the first liquid lens and the second liquid lens; and
generating, by a clock module, a clock signal for performing a synchronization with the first lens module and the second lens module.

16. The method of claim 14, wherein the step of generating, by the driving device, a signal for controlling driving of the first lens module and the second lens module includes:
measuring, by a sensor, a position and a direction;
performing, by an optical image stabilization controller, an optical image stabilization function by allowing the first interface and the second interface to be changed;
outputting, by a voltage driver, a voltage for driving the first liquid lens and the second liquid lens; and
generating, by a clock module, a clock signal for performing a synchronization with the first lens module and the second lens module.

17. The method of claim 14, wherein the transmission of the same signal generated from the driving device to the first liquid lens and the second liquid lens is a transmission of a same voltage value outputted from a voltage driver within the driving device to the first liquid lens and the second liquid lens, and
wherein the first lens module and the second lens module have a same focus.

18. The method of claim 14, wherein in the first liquid lens a shape of the first interface is adjusted by receiving a first voltage, and
wherein in the second liquid lens a shape of the second interface is adjusted by receiving a second voltage.

19. A camera module comprising:
a first lens module comprising a first liquid lens comprising two or more liquids to form a first interface, and at least one first solid lens;
a second lens module comprising a second liquid lens comprising two or more liquids to form a second interface, and at least one second solid lens, a driving device configured to generate a signal to controllably drive the first lens module and the second lens module; and a switching device configured to selectively transmit the signal generated from the driving device to one liquid lens of the first liquid lens and the second liquid lens;

wherein the driving device comprises a controller configured to repeat, for a preset time, an operation of opening one switch of two switches comprised in the switching device and short-circuiting the other switch, and wherein the first lens module is disposed on a first optical axis and the second lens module is disposed on a second optical axis, the first axis and the second optical axis being in parallel to each other.

* * * * *